(12) United States Patent
Bassett et al.

(10) Patent No.: US 7,763,170 B2
(45) Date of Patent: *Jul. 27, 2010

(54) KEYED FILTER ASSEMBLY

(75) Inventors: Laurence W. Bassett, Killingworth, CT (US); William Contaxis, III, Milford, CT (US); Bruce G. Taylor, Kensington, CT (US); David A. Carbo, East Haddam, CT (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/173,692

(22) Filed: Jul. 15, 2008

(65) Prior Publication Data

US 2009/0020470 A1 Jan. 22, 2009

Related U.S. Application Data

(63) Continuation of application No. 10/976,571, filed on Oct. 29, 2004, now Pat. No. 7,407,148, which is a continuation-in-part of application No. 10/734,498, filed on Dec. 12, 2003, now Pat. No. 6,949,189, which is a continuation-in-part of application No. 10/208,492, filed on Jul. 30, 2002, now abandoned, which is a continuation of application No. 09/553,982, filed on Apr. 20, 2000, now Pat. No. 6,458,269.

(51) Int. Cl.
 *B01D 27/08* (2006.01)
(52) U.S. Cl. .................. 210/232; 210/234; 210/235; 210/443
(58) Field of Classification Search ............ 210/234, 210/235, 249, 440, 443, 444
 See application file for complete search history.

(56) References Cited

U.S. PATENT DOCUMENTS

| 2,338,291 | A | 1/1944 | McIntosh |
| 2,991,885 | A | 7/1961 | Gutkowski |
| 3,529,515 | A | 9/1970 | Lang |
| 3,746,171 | A | 7/1973 | Thomsen |
| 3,914,176 | A | 10/1975 | Holmes |
| 4,006,752 | A | 2/1977 | DeVale |
| 4,271,020 | A | 6/1981 | Van Meter |

(Continued)

FOREIGN PATENT DOCUMENTS

DE  1134659  8/1962

(Continued)

OTHER PUBLICATIONS

Communication from Aleksander Medved to PTO dated Jan. 29, 2009.

*Primary Examiner*—Matthew O Savage
(74) *Attorney, Agent, or Firm*—Aleksander Medved

(57) ABSTRACT

Disclosed is a unique filter assembly for ensuring replacement cartridge compatibility in filtration systems having replaceable filter cartridges with lugged mounting systems. One representative filter assembly includes a representative cartridge member having a body portion for enclosing filter media and a neck portion depending therefrom. The representative neck portion of the representative cartridge includes at least one axial inlet port for directing unfiltered fluid into the body portion and at least one axial outlet port for directing filtered fluid out of the body portion. The representative neck portion also has at least two representative lugs depending radially outwardly therefrom, wherein at least one lug defines a keyed surface formation.

22 Claims, 28 Drawing Sheets

U.S. PATENT DOCUMENTS

| | | | |
|---|---|---|---|
| 4,363,829 A | 12/1982 | Seshimoto et al. | |
| 4,396,512 A | 8/1983 | Beauman et al. | |
| 4,437,499 A | 3/1984 | Devale | |
| 4,440,200 A | 4/1984 | DeVale et al. | |
| 4,515,692 A | 5/1985 | Chandler et al. | |
| 4,529,514 A | 7/1985 | Gruett | |
| 4,548,227 A | 10/1985 | Regunathan et al. | |
| 4,556,484 A | 12/1985 | Hunter et al. | |
| 4,594,361 A | 6/1986 | Beauman et al. | |
| 4,645,601 A | 2/1987 | Regunathan et al. | |
| 4,654,142 A | 3/1987 | Thomsen et al. | |
| 4,725,354 A | 2/1988 | Thomsen et al. | |
| 4,731,183 A | 3/1988 | Schumacher, II | |
| 4,735,716 A | 4/1988 | Petrucci et al. | |
| 4,759,474 A | 7/1988 | Regunathan et al. | |
| 4,770,770 A | 9/1988 | Regunathan et al. | |
| 4,806,240 A | 2/1989 | Giordano et al. | |
| 4,857,189 A | 8/1989 | Thomsen et al. | |
| 4,859,328 A | 8/1989 | Groezinger et al. | |
| 4,904,382 A | 2/1990 | Thomsen | |
| 4,915,831 A | 4/1990 | Taylor | |
| 4,956,086 A | 9/1990 | Thomsen et al. | |
| 5,035,797 A | 7/1991 | Janik | |
| 5,049,269 A | 9/1991 | Shah | |
| 5,114,572 A | 5/1992 | Hunter et al. | |
| RE34,031 E | 8/1992 | Thomsen et al. | |
| RE34,050 E | 9/1992 | Thomsen et al. | |
| 5,180,015 A | 1/1993 | Ringgenberg et al. | |
| 5,186,829 A | 2/1993 | Janik | |
| 5,336,406 A | 8/1994 | Stanford et al. | |
| 5,354,464 A | 10/1994 | Slovak et al. | |
| 5,486,288 A | 1/1996 | Stanford et al. | |
| 5,527,470 A | 6/1996 | Suda | |
| 5,560,824 A | 10/1996 | Sann et al. | |
| 5,653,871 A | 8/1997 | Thomsen | |
| 5,705,067 A | 1/1998 | Sumi et al. | |
| 5,753,107 A | 5/1998 | Magnusson et al. | |
| 5,766,463 A | 6/1998 | Janik et al. | |
| 5,826,854 A | 10/1998 | Janvrin et al. | |
| 5,833,849 A | 11/1998 | Primdahl | |
| 5,837,137 A | 11/1998 | Janik | |
| 5,914,037 A | 6/1999 | Yen | |
| 6,027,644 A | 2/2000 | Magnusson et al. | |
| D433,094 S | 10/2000 | Magnusson et al. | |
| 6,139,738 A | 10/2000 | Maxwell | |
| 6,193,884 B1 | 2/2001 | Magnusson et al. | |
| 6,217,762 B1 | 4/2001 | Rooney et al. | |
| 6,360,764 B1 | 3/2002 | Fritze | |
| D455,814 S | 4/2002 | Magnusson et al. | |
| 6,426,001 B1 | 7/2002 | Fritze | |
| 6,458,269 B1 | 10/2002 | Bassett et al. | |
| D472,299 S | 3/2003 | Fritze | |
| D472,604 S | 4/2003 | Fritze | |
| 6,555,000 B2 | 4/2003 | Knight | |
| 6,579,455 B1 | 6/2003 | Muzik et al. | |
| 6,632,355 B2 | 10/2003 | Fritze | |
| 6,649,056 B2 | 11/2003 | Fritze | |
| 6,695,891 B2 | 2/2004 | Reid | |
| 6,949,189 B2 | 9/2005 | Bassett et al. | |
| 7,067,054 B2 | 6/2006 | Fritze | |
| 7,135,113 B2 * | 11/2006 | Bassett et al. | 210/232 |
| 7,147,772 B2 | 12/2006 | Fritze | |
| 7,407,148 B2 | 8/2008 | Bassett et al. | |
| 2002/0166805 A1 | 11/2002 | Minns et al. | |
| 2002/0185425 A1 | 12/2002 | Bassett et al. | |
| 2005/0023206 A1 * | 2/2005 | Fritze | 210/235 |

FOREIGN PATENT DOCUMENTS

| | | |
|---|---|---|
| DE | 4021790 | 1/1992 |
| EP | 0 395 197 | 10/1990 |
| EP | 0 580 501 A1 | 1/1994 |
| JP | 60-014914 | 1/1985 |
| WO | WO 94/02407 | 2/1994 |
| WO | WO 97/45362 | 12/1997 |
| WO | WO 02/076575 | 10/2002 |

* cited by examiner

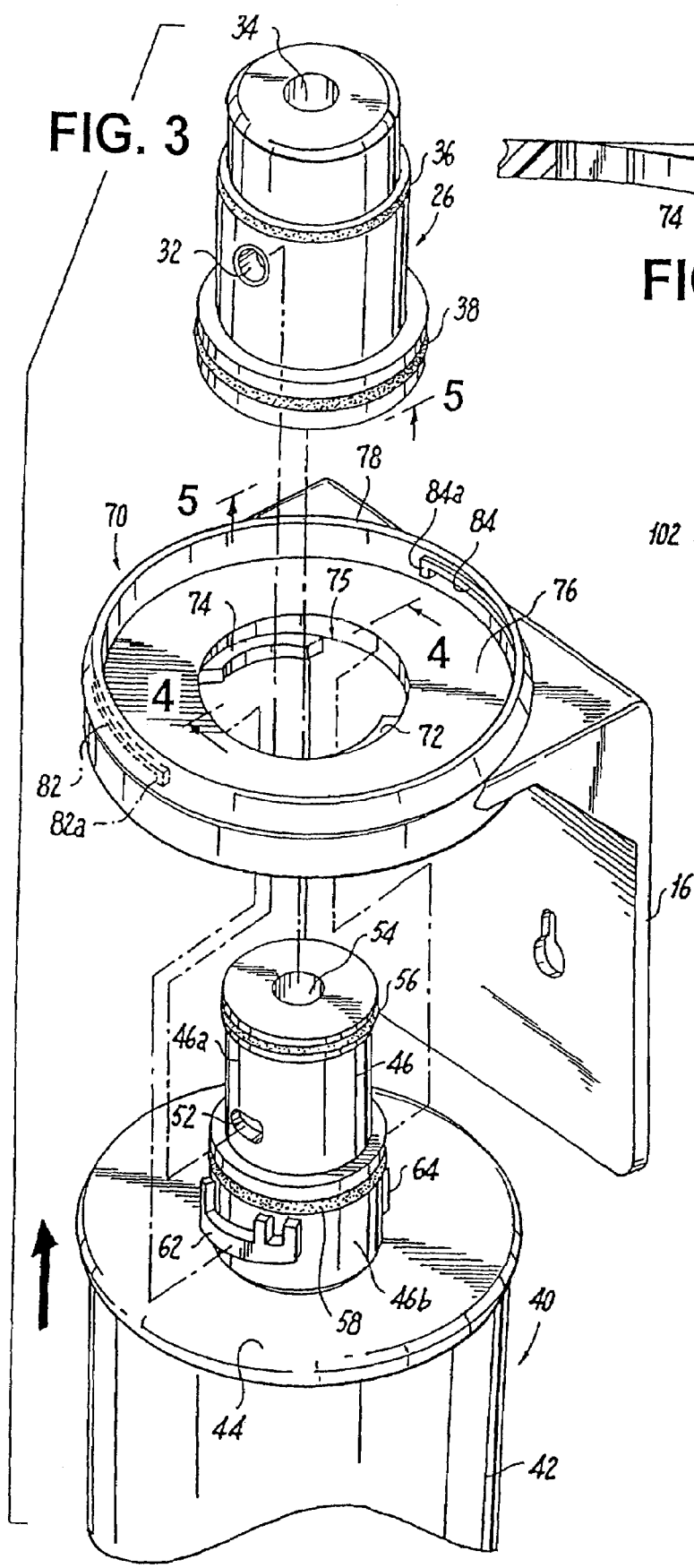
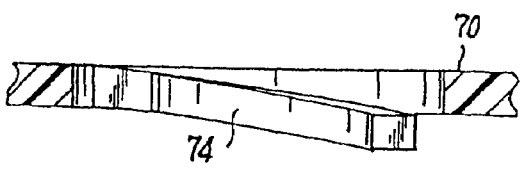
FIG. 4
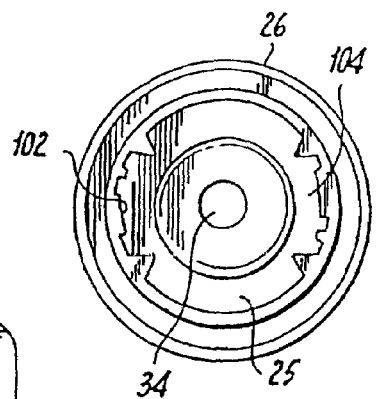
FIG. 5

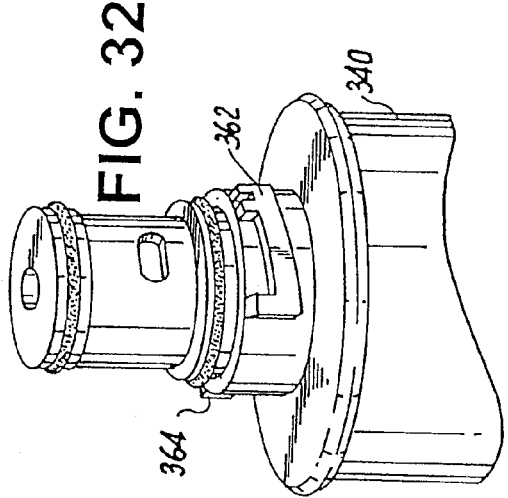
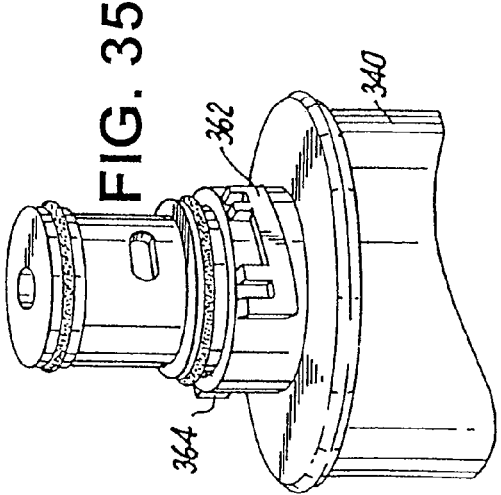
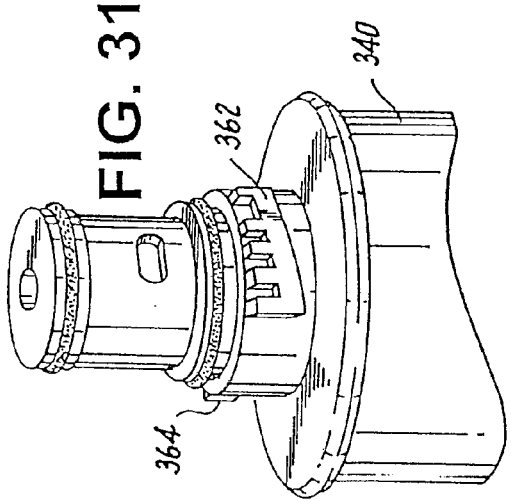
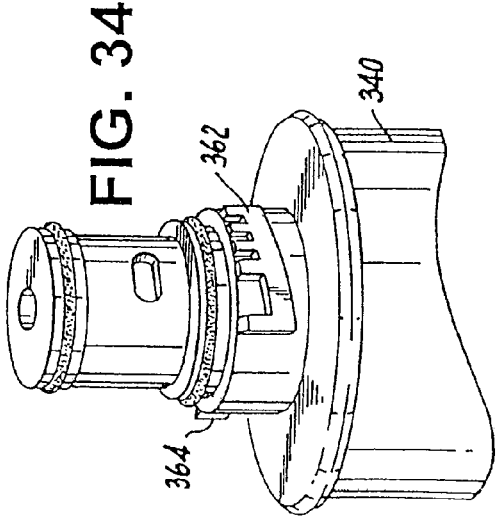
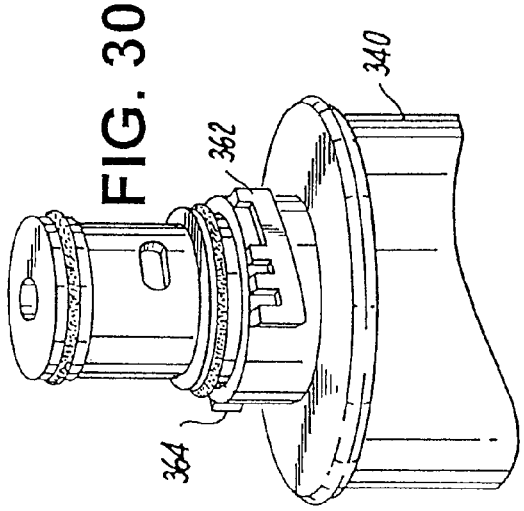
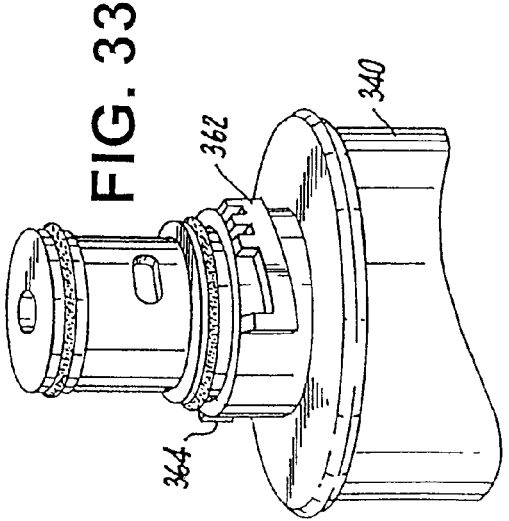

FIG. 41
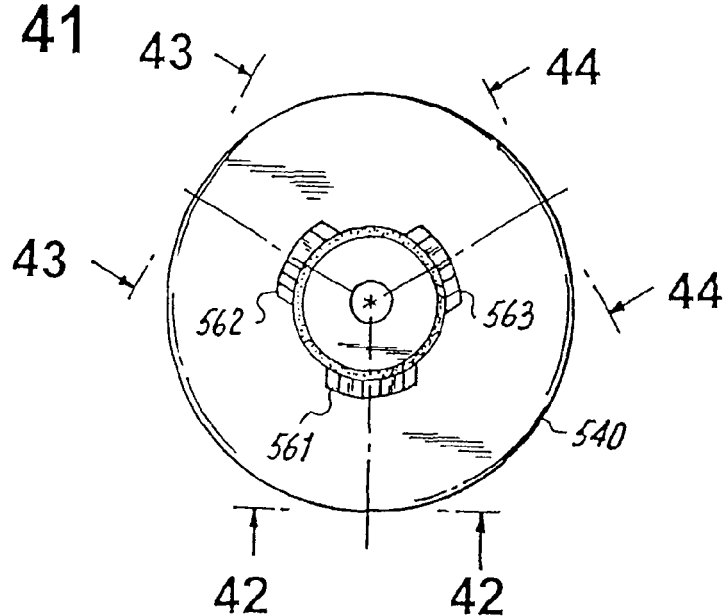
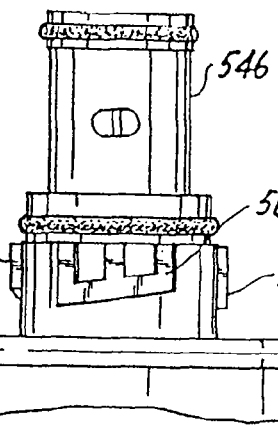
FIG. 42
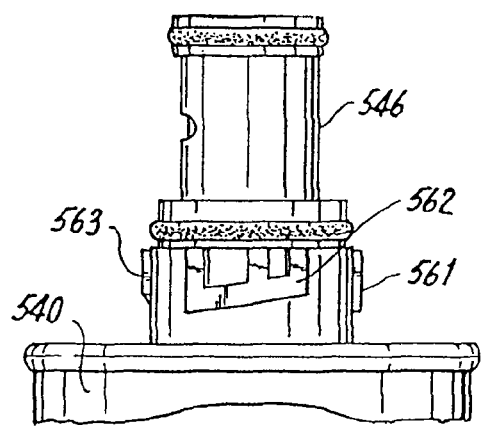
FIG. 43
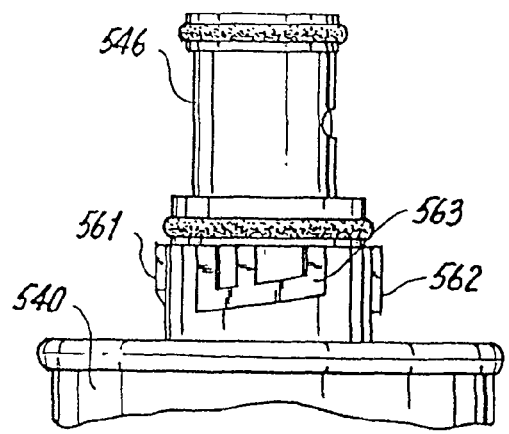
FIG. 44

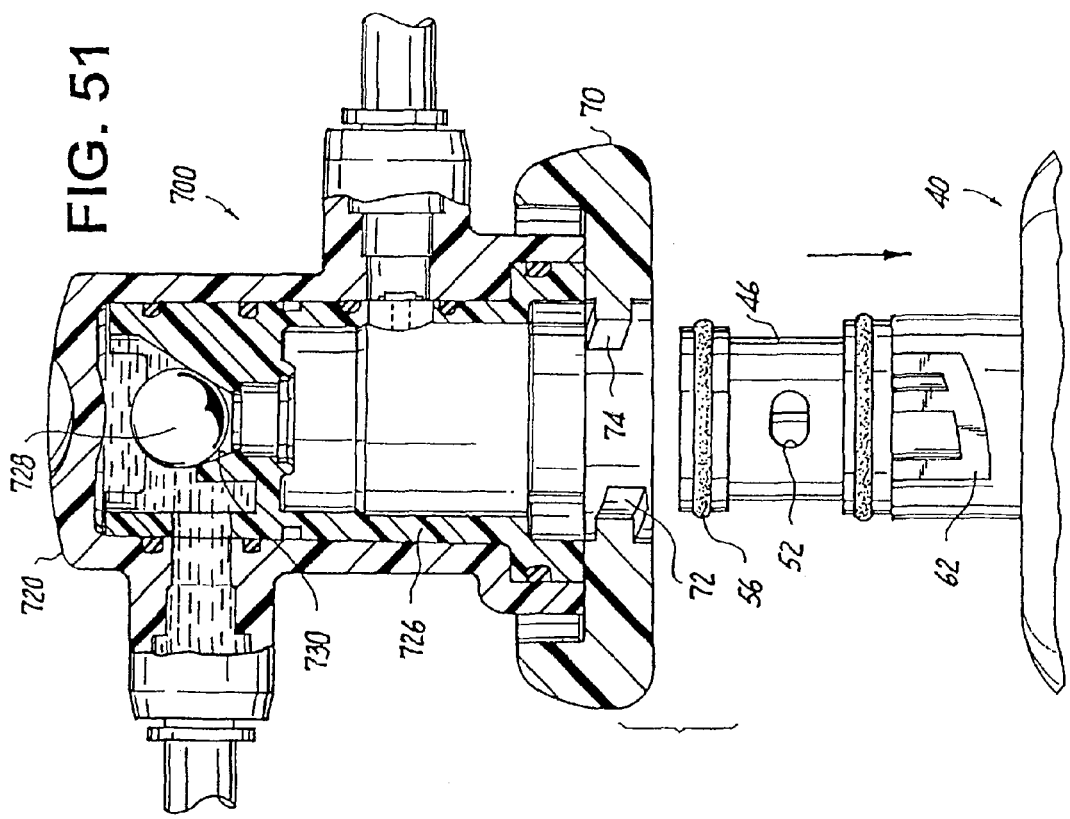
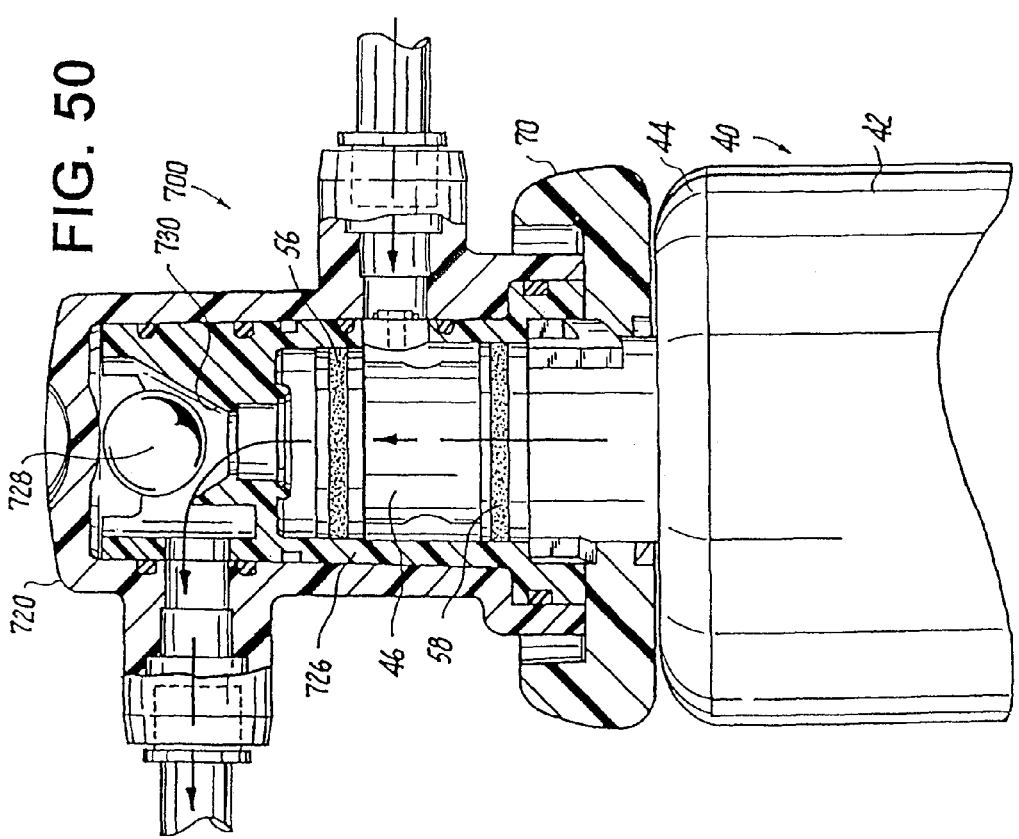

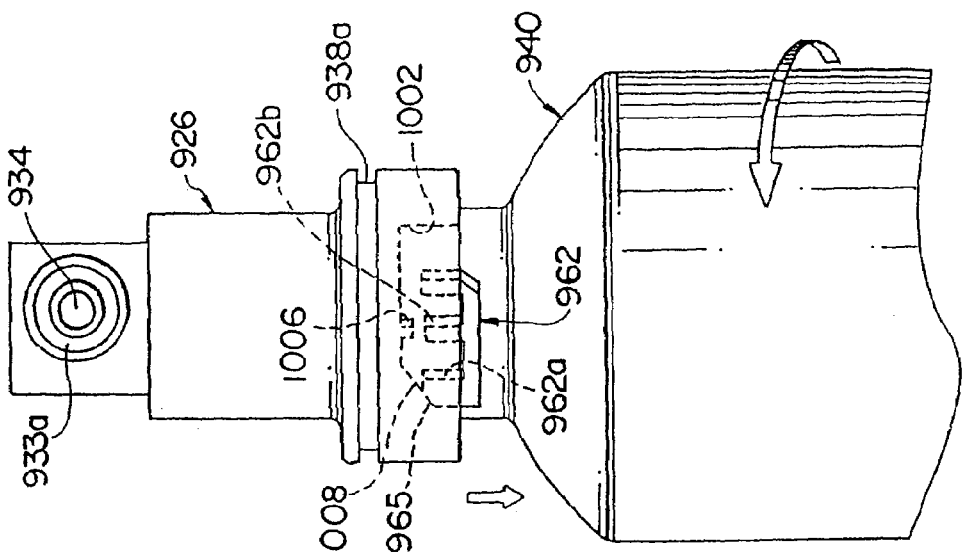
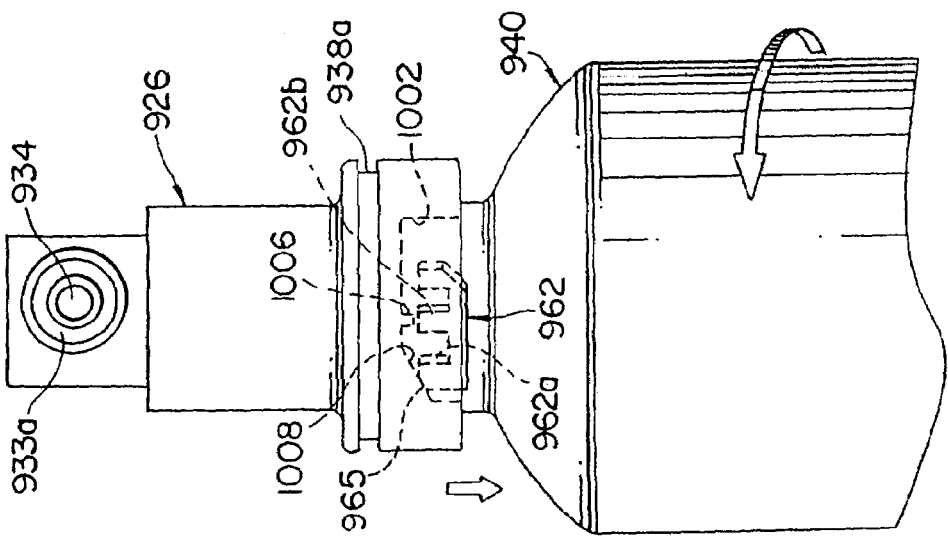
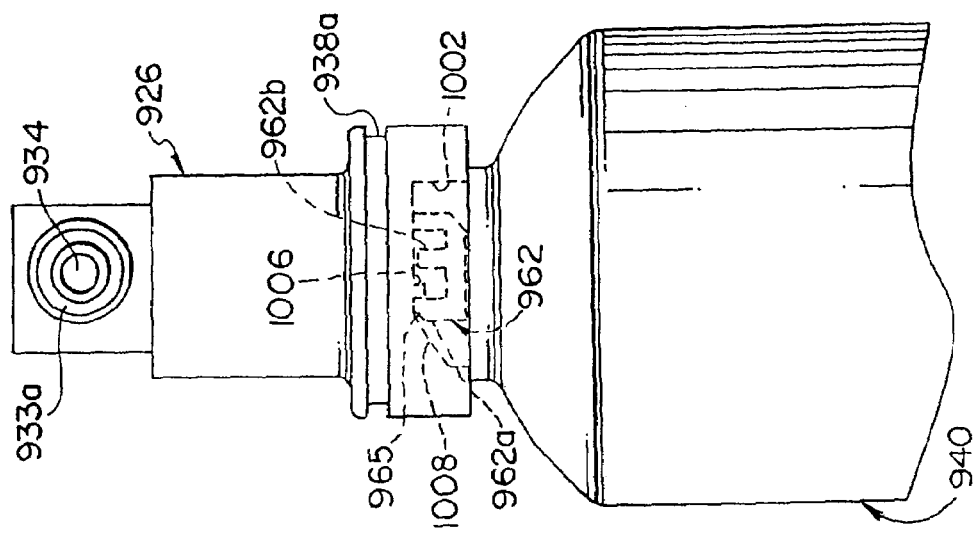

KEYED FILTER ASSEMBLY

RELATED APPLICATIONS

This application is a continuation of U.S. application Ser. No. 10/976,571, filed Oct. 29, 2004, now U.S. Pat. No. 7,407,148, which is a continuation-in-part of U.S. application Ser. No. 10/734,498 filed Dec. 12, 2003, now U.S. Pat. No. 6,949,189, which is a continuation-in-part of U.S. application Ser. No. 10/208,492 filed Jul. 30, 2002, now abandoned, which is a continuation of U.S. application Ser. No. 09/553,982 filed Apr. 20, 2000, now U.S. Pat. No. 6,458,269, the disclosure of each is hereby incorporated by reference.

BACKGROUND OF THE DISCLOSURE

The subject disclosure relates to fluid filtration devices, and more particularly, to a filter assembly having a keyed lockout system to ensure replacement filter cartridge compatibility, and to a rotary valve assembly configured to operate in a filter mode when the filter cartridge is installed in the system and a by-pass mode when the filter cartridge is removed from the system.

Commercial vending machines for dispensing liquids such as coffee or soft drinks are wide spread in our society. It is common to filter liquids such as water in these vending machines before they are dispensed by circulating the water through an appropriate filter. It is also commonplace to find filtering devices in consumer appliances such as refrigerators for filtering drinking water and for ice production. Commercial and domestic filtering devices of this type have a limited useful life and require frequent replacement. Examples of prior art replaceable filtering devices of this type are disclosed in commonly assigned U.S. Pat. No. 4,735,716 to Petrucci et al. and U.S. Pat. No. 4,806,240 to Giordano et al.

In most instances, the replaceable filters employed in commercial and consumer appliances are manufactured in accordance with particular design specifications and performance parameters provided by the appliance manufacturer. In many cases, the filter media used in such filters consists of a proprietary material or is manufactured using a proprietary process. Thus, appliance manufactures often recommend that replacement cartridges be purchased from the original equipment provider so as to ensure the integrity and proper operation of the filtering system.

Oftentimes, the owner of a household appliance or the maintenance personnel servicing a commercial vending machine is not aware of the replacement filter specifications and operating parameters of the filtering system. Consequently, they unknowingly jeopardize the integrity of the filtration system by replacing a used filter with an inferior or incompatible replacement filter supplied by an after-market manufacturer. This problem has also been encountered by automotive filter manufacturers, as inferior replacement fuel filters are frequently installed in a vehicle without the knowledge of the vehicle owner or operator.

One solution to this problem is disclosed in U.S. Pat. No. 5,035,797 to Janik, wherein a key system is provided to ensure replacement cartridge compatibility for axially mounted fuel filters with threaded retaining collars. The key system employs a unique matrix of axially projecting keys formed in a base for axially receiving a filter cartridge, and a corresponding matrix of slots formed in a compatible cartridge, so that for a given compatible cartridge and base, the keys are interlockable in the slots to securely lock the cartridge in the base. For each non-compatible cartridge and base, the base keys are not-mateable with the cartridge slots and interfere with the mounting of the cartridge to the base. A similar key system is disclosed in U.S. Pat. No. 5,186,829 to Janik, which includes a set of angularly spaced arcuate projections that protrude radially from the cylindrical side wall of the fuel filter cartridge to mate with corresponding spaced apart recesses in the base when the cartridge is axially pushed into the base. U.S. Pat. No. 5,837,137 to Janik discloses yet another key system for an axially mounted fuel filter with a threaded retaining collar.

While such prior art key systems are suitable for use in conjunction with axially mountable automotive fuel filters having threaded retaining collars, they are not easily adapted for use in conjunction with consumer and industrial water filtration systems wherein the filter cartridge is provided with a set of cam lugs configured to facilitate rotatable mounting of the cartridge to a base or supporting structure. Examples of prior art filter cartridges having lugged engagement portions are disclosed in the Petrucci et al. and Giordano et al. patents discussed hereinabove, and in U.S. Pat. Nos. 4,857,189 and 4,956,086 to Thomsen et al. It would beneficial to provide a key system for replaceable filter cartridges having lugged mounting systems.

SUMMARY OF THE DISCLOSURE

The present disclosure is directed to a unique filter assembly for ensuring replacement cartridge compatibility in filtration systems having replaceable filter cartridges with lugged mounting systems. In accordance with one representative preferred representative embodiment of the present disclosure, the filter assembly comprises a cartridge member, which includes a body portion for enclosing filter media and a neck portion depending therefrom. The neck portion of the cartridge includes at least one inlet port for directing unfiltered fluid into the body portion and at least one outlet port for directing filtered fluid out of the body portion. The neck also has at least two lugs depending radially outwardly therefrom, wherein at least one lug defines a keyed engagement surface, a leading inclined cam surface and a trailing inclined cam surface. Preferably, the keyed engagement surface is on an axially facing surface of the at least one lug.

In another representative, preferred embodiment, the neck portion of the cartridge member includes first and second axially facing surfaces. The first axially facing surface has at least one inlet port formed therein and the second axially facing surface has at least one outlet port formed therein.

Still further, it is envisioned that each lug defines a keyed engagement surface, a leading inclined cam surface and a trailing inclined cam surface. Still further, it is envisioned that the keyed engagement surface defined on each lug of the cartridge member is substantially similar. Alternatively, the keyed engagement surface defined on each lug of the cartridge member can be different.

The representative filter assembly may further include a head member which defines an axial chamber and includes inlet and outlet passages that communicate with the chamber. A valve member is rotatably disposed within the axial chamber of the head member and defines an axial cavity for receiving the neck portion of the cartridge member to facilitate communication between the inlet and outlet passages of the head member and the inlet and outlet ports of the neck portion. The cavity formed in the valve member defines at least one reception slot, which includes a surface for mating with the keyed engagement surface formed on the lug(s). The reception slot(s) further defines at least one inclined surface for interacting with the trailing inclined cam surface formed on the lug(s) to facilitate engagement and/or disengagement of the cartridge member with the axial cavity of the valve member.

The representative filter assembly may further include a support member which is disposed between the head member and the cartridge member and includes an aperture for receiving the neck portion of the cartridge member. The aperture has an inner surface that defines at least two cam ramps for interacting with the leading inclined cam surface formed on the lug(s) to facilitate engagement of the lug(s) of the cartridge member with the support member.

In another representative, preferred embodiment of the present disclosure, the neck portion of the cartridge member has a pair of diametrically opposed lugs. Alternatively, the neck portion of the cartridge member has three circumferentially spaced apart lugs. In a still further representative embodiment, the neck portion of the cartridge member has first and second pairs of diametrically opposed lugs, wherein the first pair of lugs is disposed at a first height on the neck portion and the second pair of lugs is disposed at a second height on the neck portion.

The present disclosure is also directed to a representative filter cartridge, which includes a body portion and a neck portion. The body portion of the cartridge encloses filter media for filtering a fluid, which is passed therethrough. The neck portion communicates with the body portion and includes an inlet port for directing unfiltered fluid into the body portion and at least one outlet port for directing filtered fluid out of the body portion. The neck portion, presently preferably, has at least two lugs, which depend radially outwardly therefrom, wherein at least one lug defines a keyed engagement surface, a leading inclined cam surface and a trailing inclined cam surface. The keyed engagement surface enables the cartridge to mate with a compatible reception assembly and the trailing inclined cam surface facilitating the mating therewith.

In an alternative representative embodiment of the present disclosure, each lug defines a keyed engagement surface, a leading inclined cam surface and a trailing inclined cam surface. Still further, it is envisioned that the keyed engagement surfaces defined on each lug of the cartridge member can be substantially similar or alternatively, they can be different.

Presently preferably, the neck portion of the cartridge member has a pair of diametrically opposed lugs. Alternatively, the neck portion of the cartridge member has three circumferentially spaced apart lugs. In a still further representative embodiment, the neck portion of the cartridge member has first and second pairs of diametrically opposed lugs, wherein the first pair of lugs is disposed at a first height on the neck portion and the second pair of lugs is disposed at a second height on the neck portion.

The present disclosure is also directed to a filter cartridge, which includes a body portion for enclosing filter media for filtering a fluid and a neck portion which communicates with the body portion. The neck portion includes at least one axial inlet port for directing unfiltered fluid into the body portion, at least one axial outlet port for directing filtered fluid out of the body portion and a neck portion having at least two lugs depending radially outwardly therefrom.

Presently preferably, the at least one lug defines a keyed engagement surface, a leading inclined cam surface and a trailing inclined cam surface, the keyed engagement surface enabling the cartridge to mate with a compatible reception assembly.

It is envisioned that the neck portion has first and second circumferential grooves formed therein which are adapted and configured for receiving an O-ring seal. The first circumferential groove is positioned between the at least one inlet port of the neck member and the body portion and the second circumferential groove is positioned between the at least one inlet port and the at least one outlet port. Alternatively, it is understood that the positions of the at least one inlet port and the at least one outlet port could be reversed and the filter cartridge would remain operative.

The present disclosure is also directed to a representative filter assembly, which includes a replaceable cartridge, a head member, a valve and a support structure. The cartridge has a body portion for enclosing filter media and a neck portion that includes at least one axially extending inlet port for directing unfiltered fluid into the body portion and at least one axially extending outlet port for directing filtered fluid out of the body portion. The neck portion has at least two lugs depending radially outwardly therefrom, the at least one lug defining a keyed engagement surface, a leading inclined cam surface and a trailing inclined cam surface.

The present disclosure is also directed to a unique valve assembly for use in conjunction with a replaceable filter cartridge. The valve assembly includes a head member having an interior valve chamber defining a central axis, and inlet and outlet passages extending parallel to and communicating with the interior valve chamber. The valve assembly further includes a valve member having an inlet path and an outlet path, and adapted for rotation within the interior valve chamber of the head member between a filter position and a bypass position. In the filter position, the inlet path of the valve member is in fluid communication with the inlet passage of the head member and the outlet path of the valve member is in fluid communication with the outlet passage of the head member. In the bypass position, the inlet path of the valve member is out of fluid communication with the inlet passage of the head member and the outlet path of the valve member is out of fluid communication with the outlet passage of the head member. However, when the valve member is in the bypass position, the inlet and outlet passages of the head member remain in communication, allowing untreated fluid to flow therebetween.

The valve assembly further includes a seal member seated in an upper surface of the valve member and positioned to seal against an opposing surface of the interior valve chamber. The seal member includes first and second seal portions dimensioned and configured to sealingly isolate the inlet path and outlet path of the valve member, respectively, when the valve member is in the filter position. The valve member also includes third and fourth seal portions dimensioned and configured to sealingly isolate the inlet passage and outlet passage of the head member from the atmosphere, respectively, when the valve member is in the bypass position.

These and other unique features of the present disclosure and the method of constructing the same will become more readily apparent from the following description of the drawings taken in conjunction with the detailed description of the representative preferred embodiments.

BRIEF DESCRIPTION OF THE DRAWINGS

So that those having ordinary skill in the art to which the present disclosure appertains will more readily understand how to construct and use the filter cartridge assembly of the present disclosure, reference may be had to the drawings wherein:

FIG. 3 is an enlarged perspective view of the representative upper portion of the representative filter assembly of FIG. 1 including the representative filter cartridge, representative support bracket and representative head member;

FIG. 4 is a cross-sectional view of the representative support bracket shown in FIG. 3 taken along line 4-4 of FIG. 3 illustrating the representative ramped camming surface formed thereon;

FIG. 5 is bottom end view of the representative valve member shown in FIG. 3 as viewed along line 5-5 of FIG. 3;

FIGS. 28-40 illustrate each of the available key patterns for a representative camming lug having a maximum of six teeth positions;

FIG. 41 is a top plan view of the neck portion of a representative filter cartridge constructed in accordance with a preferred representative embodiment of the present disclosure which includes three circumferentially representative spaced camming lugs each having a different key formation thereon;

FIG. 42 is a side elevational view of the representative neck portion of the representative filter cartridge of FIG. 41, taken along line 42-42;

FIG. 43 is a side elevational view of the representative neck portion of the representative filter cartridge of FIG. 41, rotated 120° from the view shown in FIG. 42;

FIG. 44 is a side elevational view of the representative neck portion of the representative filter cartridge of FIG. 41, rotated 120° from the view shown in FIG. 43;

FIG. 50 is a side elevational view in cross-section, of another representative filter assembly constructed in accordance with a preferred representative embodiment of the present disclosure wherein a representative ball valve is positioned within the assembly to inhibit the representative egress of fluid from the system when the filter cartridge is removed from the assembly, with the ball valve shown in an open position;

FIG. 51 is a side elevational view in cross-section, of the representative filter assembly of FIG. 50 with the ball valve shown in a closed position as the representative filter cartridge is removed from the assembly;

FIGS. 62-64 are enlarged perspective views of the upper portion of the representative filter assembly of FIG. 54 illustrating disengagement of the replaceable representative filter cartridge assembly from the valve member;

These and other features of the representative filter assembly of the present disclosure will become more readily apparent to those having ordinary skill in the art form the following detailed description of the representative preferred embodiments.

DETAILED DESCRIPTION OF THE DISCLOSURE

Figure 1:
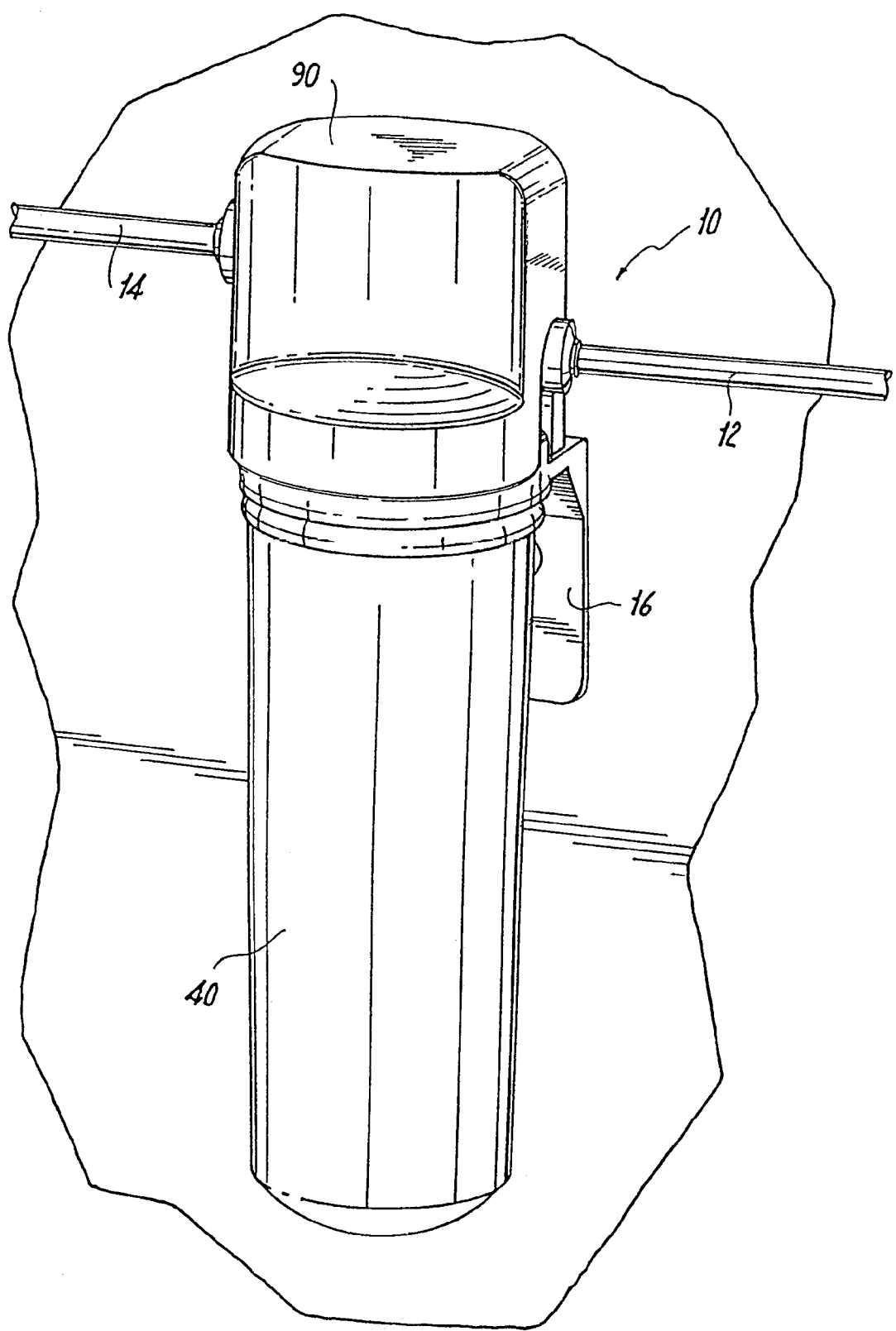
FIG. 1 is a perspective view of a filter assembly constructed in accordance with a representative preferred embodiment of the present disclosure.

Referring now to the figures wherein like reference numerals identify similar structural elements of the filter assembly of the subject disclosure, there is illustrated in FIG. 1 a filter assembly constructed in accordance with a preferred representative embodiment of the subject disclosure and designated generally by reference numeral 10. Filter assembly 10 is configured for use in conjunction with a fluid processing system that includes an inlet conduit 12 for delivering unfiltered process fluid into the filter assembly and an outlet conduit 14 for delivering filtered process fluid from the filter assembly 10. Filter assembly 10 is preferably mounted to a supporting structure associated with the fluid processing system by a bracket 16.

Figure 2:
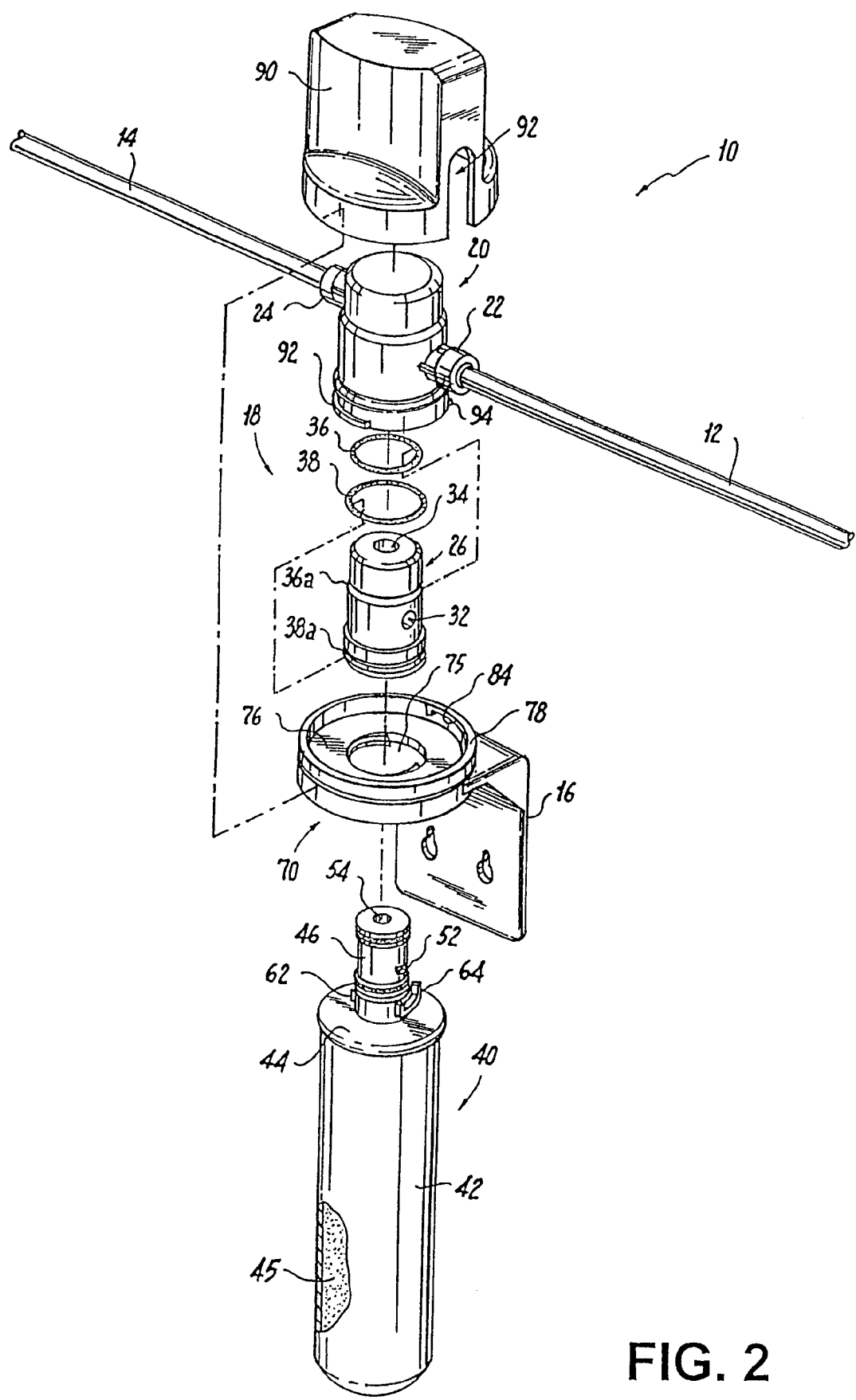
FIG. 2 is an exploded perspective view of the representative filter assembly of FIG. 1 with parts separated for ease of illustration.

Referring to FIG. 2, filter assembly 10 includes a unique rotary valve assembly 18 that consists of a head portion 20 defining an interior chamber having an inlet port 22 for communicating with inlet conduit 12 and an outlet port 24 for communicating with outlet conduit 14. Rotary valve assembly 18 further includes a valve member 26 configured for reception within the interior chamber of head portion 20 in such a manner so as to facilitate rotation of the valve member relative to the head portion between an open position wherein fluid is permitted to flow through the filter assembly and a closed position wherein flow through the filter assembly is restricted. (See FIGS. 10-11).

Figure 6:
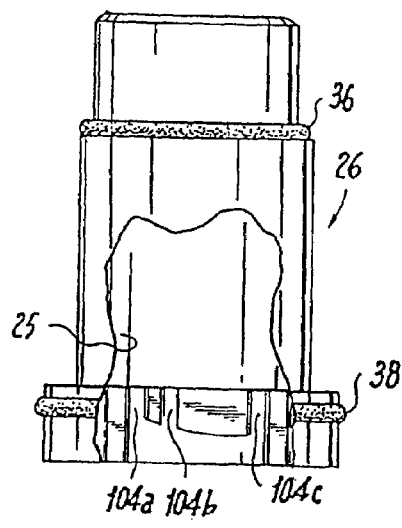
FIG. 6 is an elevational view of the representative valve member of FIG. 3, with a representative portion of the outer wall broken away to illustrate representative interior surface features thereof.
Figure 7:
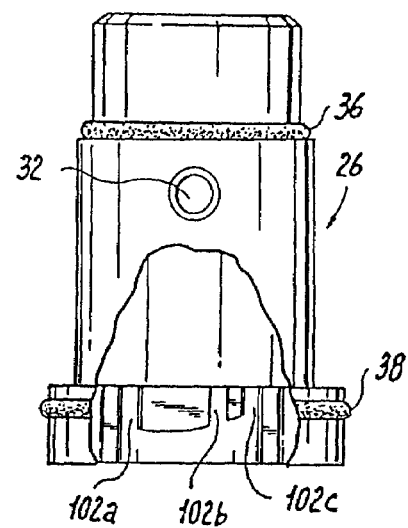
FIG. 7 is an elevational view of the representative valve member of FIG. 3, with a representative portion of the outer wall broken away and rotated 180° from the position shown in FIG. 6 to illustrate representative interior surface features thereof.
Figure 8:
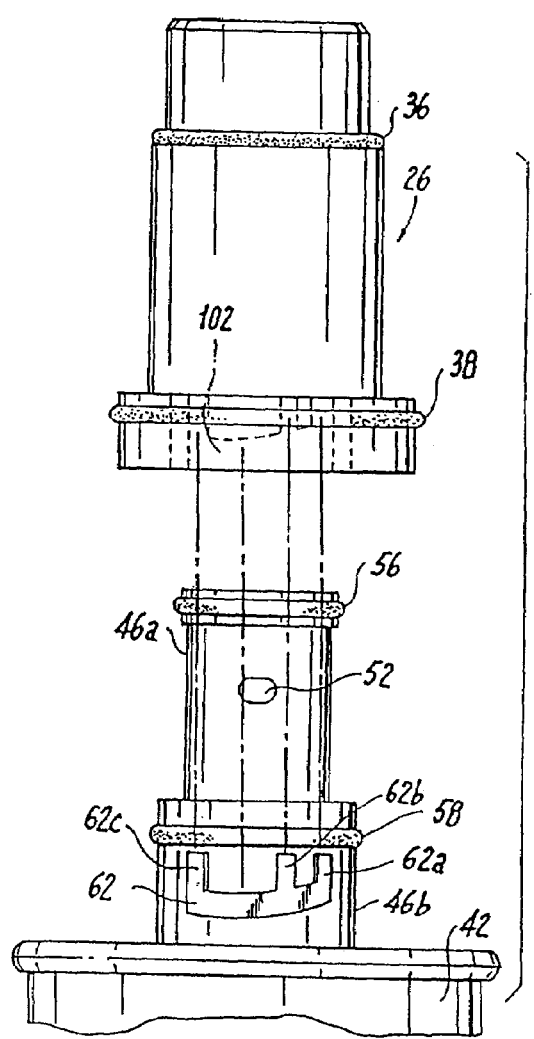
FIG. 8 is an elevational view of the representative upper portion of the filter cartridge and the valve member of FIG. 3, with the representative interlocking features thereof in axial alignment to facilitate the engagement therebetween.
Figure 9:
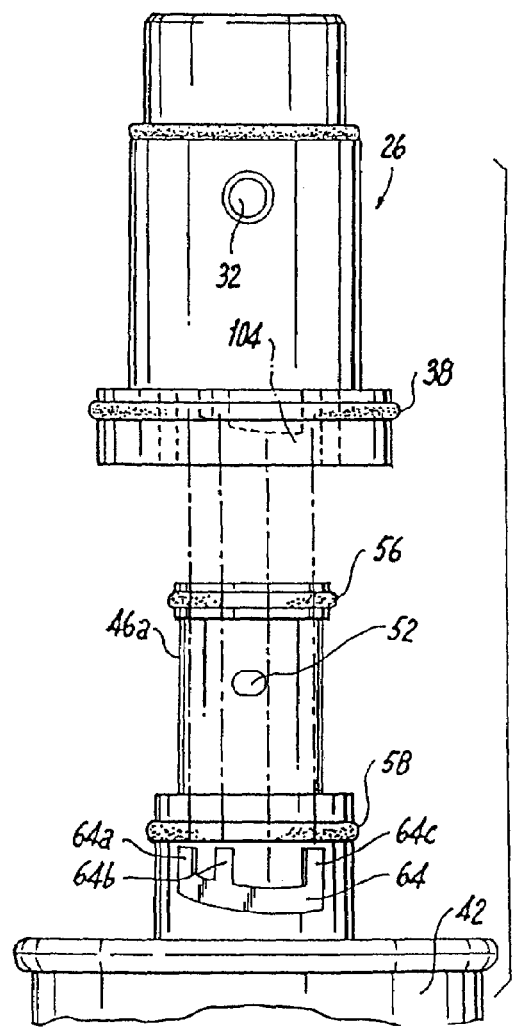
FIG. 9 is an elevational view of the representative upper portion of the representative filter cartridge and the representative head member of FIG. 3, rotated 180° from the position shown in FIG. 8, with the representative interlocking features thereof in axial alignment to facilitate the engagement therebetween.

Valve member 26 includes an inlet orifice 32 for communicating with the inlet port 22 of head portion 20 and an outlet orifice 34 for communicating with the outlet port 24 of head portion 20. (See FIGS. 6-7). The body of valve member 26 includes recesses 36a and 38a for accommodating upper and lower O-ring seals 36 and 38. O-ring seal 36 serves to sealingly isolate the inlet flow from the outlet flow within the interior chamber of head portion 20 during operation, while O-ring seal 38 prevents leakage to atmosphere.

With continuing reference to FIG. 2, filter assembly 10 further includes a replaceable filter cartridge 40 constructed in accordance with a preferred representative embodiment of the present disclosure. Filter assembly 10 is adapted and configured to ensure that replacement cartridge 40 is compatible with the fluid processing system with which it is associated. Moreover, as discussed hereinbelow, the filter cartridge 40 and valve portion 26 are provided with keyed mating structures that ensure compatibility therebetween, and thus prevent the accidental or intentional installation of an incompatible or inferior replacement cartridge, which could jeopardize the integrity of the fluid processing system.

Referring to FIG. 3, replaceable filter cartridge 40 includes a generally cylindrical body portion 42 enclosing filter media for filtering process fluid. Those skilled in the art will readily appreciate that any one of a variety of different types of filter media could be enclosed within the body portion including, for example, pleated media, micro-fibers or carbon media. An end cap 44 encloses the body portion 42, and a cylindrical neck portion 46 depends from the end cap 44. Those skilled in the art will readily appreciate that the end cap 44 and body portion 42 can be joined together by sonic welding, spin welding or other similar methods known in the art. The neck portion 46 of filter cartridge 40 is adapted and configured for reception with the interior cavity of valve member 26 (see FIGS. 6-9) and includes an upper section 46a and a lower portion 46b. As would be understood by those skilled in the art, one of a plurality of possible alternative representative embodiments could include a replaceable filter cartridge 40 wherein there is no difference in the diameter of the cylindrical body portion 42 and the cylindrical neck portion 46, thus, there is no differentiation between the cylindrical bottom portion 42 and the cylindrical neck portion 46 and, thus, the location of the cam lugs 62 and 64 need only be operatively positioned on the replaceable filter cartridge 40 such that the filter cartridge 40 is operatively connected to the intermediate support flange 70 that depends from mounting bracket 16.

The upper section 46a defines a radial inlet passage 52 for receiving unfiltered process fluid entering the valve member 26 through inlet orifice 32 and directing the fluid into the body portion 42 of filter cartridge 40. The upper section 46a further defines an axial outlet passage 54 for delivering filtered process fluid from the interior of body portion 42 to the interior cavity of valve member 26 for egress through the outlet orifice 34 into the interior chamber of head portion 20. Those skilled in the art will readily appreciate that the inlet and outlet passages in the neck portion could be reversed such that the inlet flow is axial and the outlet flow is radial. The inlet and outlet passages 52 and 54 are sealingly isolated from one another by an upper O-ring seal 56 positioned at the upper end of neck portion 46. A second lower O-ring seal 58 is positioned below the radial inlet passage 52 to sealingly engage the neck portion 46 within the interior chamber of the valve member 26 and prevent the leakage of unfiltered process fluids from filter assembly 10 while in operation.

Referring to FIG. 2 in conjunction with FIG. 3, presently preferably, a pair of diametrically opposed inclined cam lugs 62 and 64 project radially outwardly from the lower section 46b of neck portion 46. Cam lugs 62 and 64 are dimensioned and configured to facilitate rotational engagement of the filter cartridge within an intermediate support flange 70 that depends from mounting bracket 16. As best seen in FIG. 3, a central aperture 75 extends through support flange 70 for receiving the neck portion 46 of filter cartridge 40. A pair of diametrically opposed cam ramps 72 and 74 project radially into central aperture 75 for interacting with the inclined lower surfaces of cam lugs 62 and 64. The cam ramps 72 and 74 are spaced from one another to allow the cam lugs 62 and 64 to fit therebetween when the neck portion is extended through aperture 75 during assembly, and they are inclined along their arc length to facilitate rotational engagement of the filter cartridge with support flange 70, as illustrated in FIG. 4.

Referring to FIGS. 2 and 3, support flange 70 further includes a recessed seating area 76 defined by annular retaining wall 78 and configured to receive and retain the head portion 20 of filter assembly 10. Diametrically opposed arcuate retention ribs 82 and 84 project inwardly from retaining wall 78 to frictionally engage with corresponding ramped engagement struts 92 and 94 that project radially outwardly from the lower region of head portion 20 when the head portion 20 is rotatably engaged within the recessed seating area 76 during assembly. Stop surfaces 82a and 84a are associated with retention ribs 82 and 84, respectively, for limiting the movement of head portion 20 within seating area 76. In an alternate representative embodiment, the head portion 20 and support flange 70 may be adapted and configured to cooperate and engage with one another in a manner described hereinbelow with respect to filter assembly 800 and illustrated in FIGS. 52-53.

As best seen in FIGS. 1 and 2, the annular retaining wall 78 of support flange 70 is also configured to accommodate and support a shroud 90, which is configured to house and protect the rotary valve assembly 18 of filter assembly 10. As illustrated, the shroud 90 includes lateral apertures, i.e., aperture 92, for accommodating inlet and outlet conduits 12 and 14. Those skilled in the art will readily appreciate that the configuration of the shroud as well as the way in which it is joined to the support flange 70 could vary depending upon the nature of the operating environment within which the system is employed.

Referring to FIG. 5, in accordance with a presently preferred representative embodiment of the present disclosure, cam lugs 62 and 64 are adapted and configured for reception within a pair of corresponding diametrically opposed reception areas 102 and 104 formed within the interior cavity 25 of valve member 26. More particularly, the upper surface of each cam lug 62, 64 is provided with a unique key formation having, in this case, a plurality of spaced apart axially projecting teeth that are adapted and configured to engage and mate with a corresponding set of spaced apart recesses formed within the reception areas of the valve member 26. This mating arrangement is designed to ensure replacement cartridge compatibility by only permitting replacement of a filter cartridge having a keyed surface formation that corresponds with the surface features of the reception areas in the valve member.

In the exemplary representative embodiment of the disclosure illustrated in FIGS. 3-9, the key formation on each cam lug (62, 64) includes three spaced apart teeth (62a-62c, 64a-64c) and each reception area (102, 104) within the valve member 26 includes three corresponding recesses (102a-102c, 104a-104c) for accommodating the teeth when the neck portion 46 of cartridge 40 is received by valve member 26.

As discussed in greater detail hereinbelow, the number of teeth that define the key formation on each cam lug can vary within the scope of this disclosure (see for example FIGS. 18-40), as can the surface geometry of the key formation (see for example FIGS. 13-17). In each instance, the reception area in the rotary valve member would have a corresponding mating configuration to accommodate the key formation formed on the cam lugs. Furthermore, it is envisioned that the key configuration on one lug could be different from the key configuration of the opposed lug. This will dramatically increase the number of possible key combinations available to a filter manufacturer.

Figure 10:
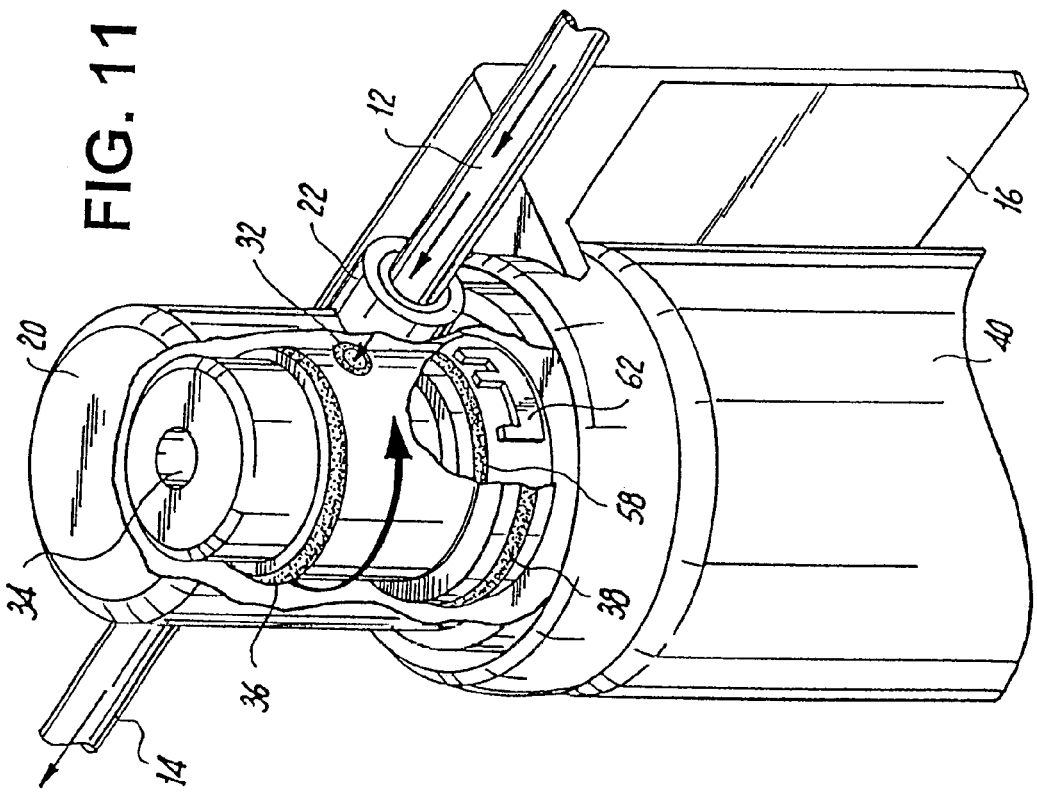
FIG. 10 is a perspective view of the representative upper portion of the representative filter assembly of the present disclosure, with the representative wall of the representative head and representative valve members broken away to illustrate the initial position of the representative keyed camming lug of the representative filter relative to the representative ramped camming surface of the representative bracket member, wherein the representative valve assembly with which the representative head member is associated is closed to flow.

Referring to FIG. 10, when a compatible filter cartridge is introduced into the filter assembly 10 of the subject disclosure, the neck portion 46 of the filter cartridge 40 is inserted through the central aperture 75 of support flange 70, with the cam lugs 62 and 64 positioned between the diametrically opposed cam ramps 72 and 74. At such a time, the valve member 26 is in the "off" position to receive the neck portion 46. Thus, the inlet and outlet orifices 32, 34 of valve member 26 are not aligned with the inlet and outlet ports 42, 44 of head portion 20. Thereupon, the teeth (62a-62c, 64a-64c) forming the keyed engagement surface of cam lugs 62 and 64 extend into the corresponding recesses (102a-102c, 104a-104c) of recessed areas 102 and 104 and mate therewith.

Figure 11:
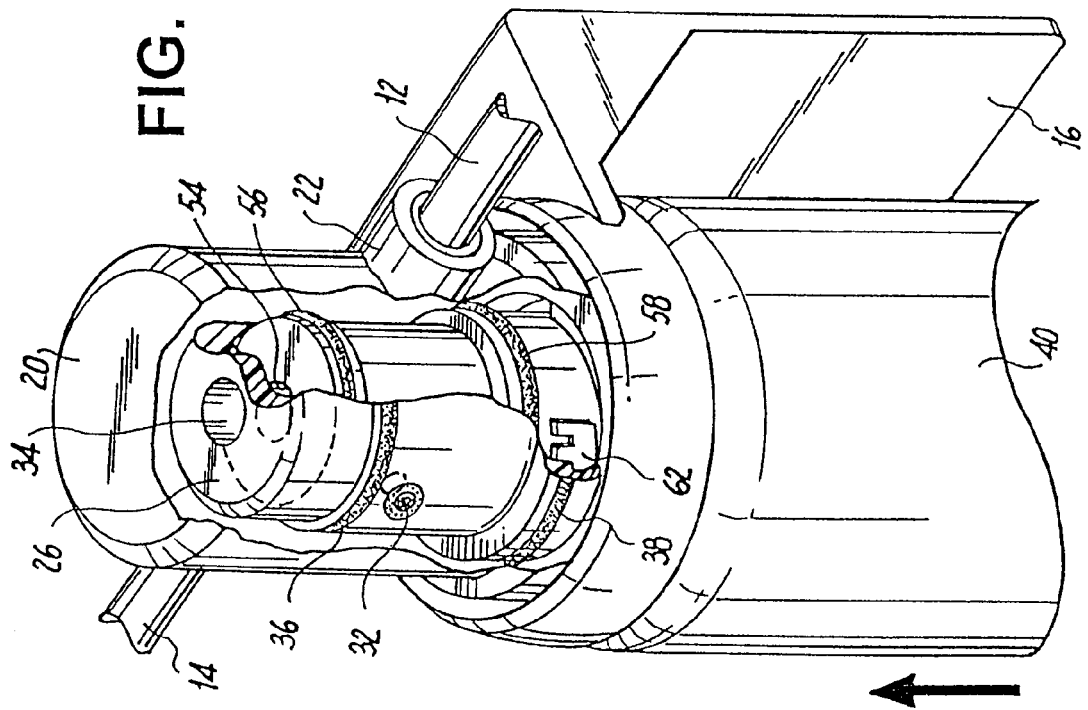
FIG. 11 is a perspective view of the representative upper portion of the representative filter assembly of the present disclosure, with the representative wall of the representative head member broken away to illustrate the final position of the representative keyed camming lug of the representative filter relative to the representative ramped camming surface of the representative bracket member, wherein the representative valve assembly with which the representative head member is associated is open to flow.

Once the neck portion 46 of filter cartridge 40 has been intimately engaged within the interior chamber of valve member 26, the cartridge and valve member may be rotated in a counter-clockwise direction with respect to the support flange 70 and head portion 20, as illustrated in FIG. 11. Upon rotating filter cartridge 40 in conjunction with valve member 26, the cam lugs 62, 64 projecting from neck portion 46 translate against the cam ramps 72, 74, causing the filter cartridge 40 to move helically upwardly in an axial direction. As a result, valve member 26 is rotated into the "on" or open position, wherein the inlet and outlet orifices 32, 34 of the valve member 26 are aligned with the inlet and outlet ports 42, 44 of head portion 20 to allow fluid to flow through the filter assembly 10.

If the cam lugs of a replacement filter cartridge introduced into the system are not configured to mate with the reception areas of the valve member, i.e., if the cam lugs have no keyed surface formation, which may be indicative of an unauthorized after-market filter cartridge, the cam lugs will interfere with and be unable to engage the reception areas in the valve member. Consequently, because the inclined cam surfaces of the cam lugs 62, 64 will be located below the inclined surfaces of the cam ramps 72, 74, the cam lugs will be unable to traverse the cam ramps. As a result, the cam lugs will be unable to effect rotation of the valve member into the "on" position to permit fluid to flow through the assembly. This will ensure replacement cartridge compatibility by preventing the use of inferior or unauthorized replacement filter cartridges.

Figure 22:
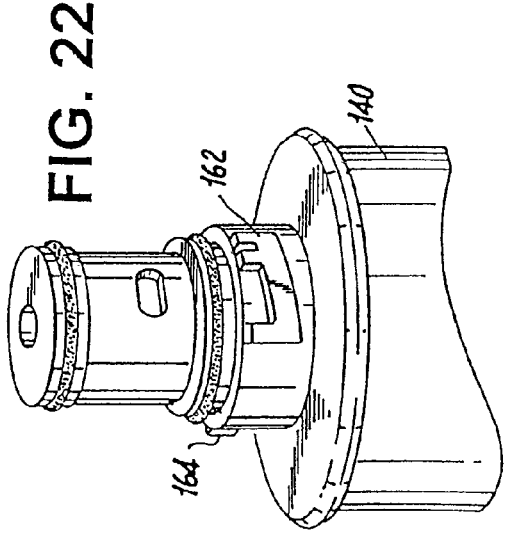
Figure 23:
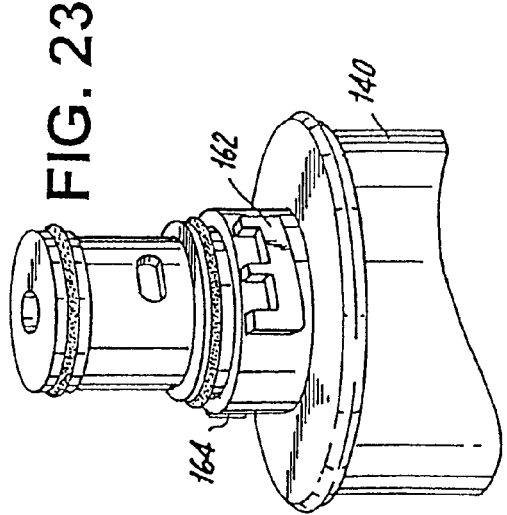
Figure 25:
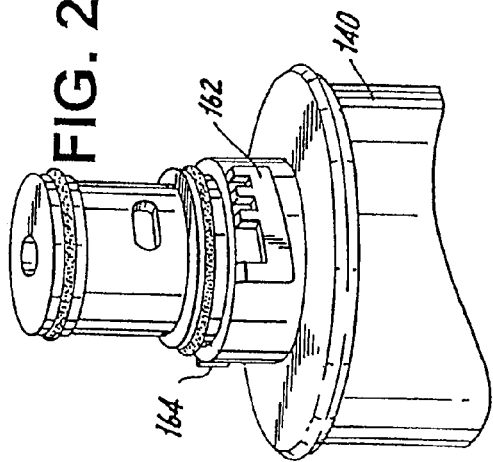
Figure 28:
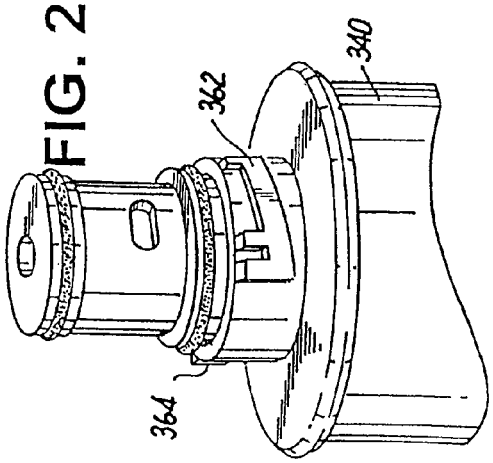
Figure 24:
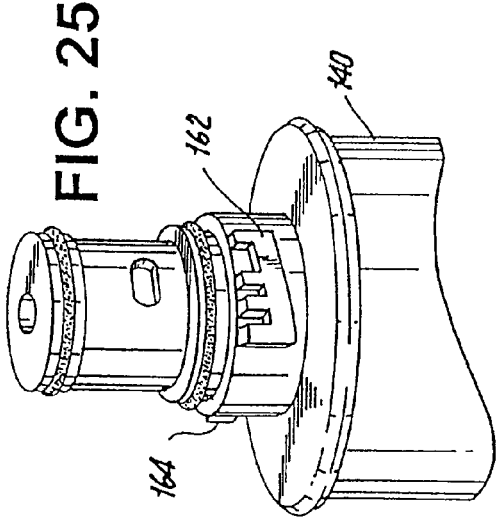
Figure 27:
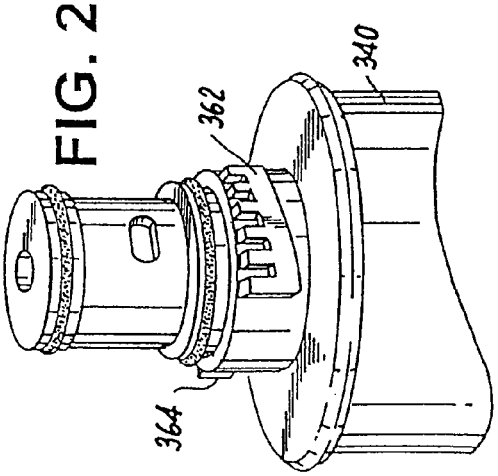
Figure 26:
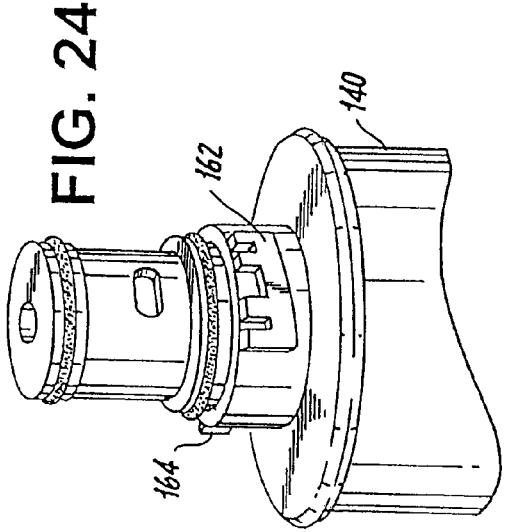
Figure 29:
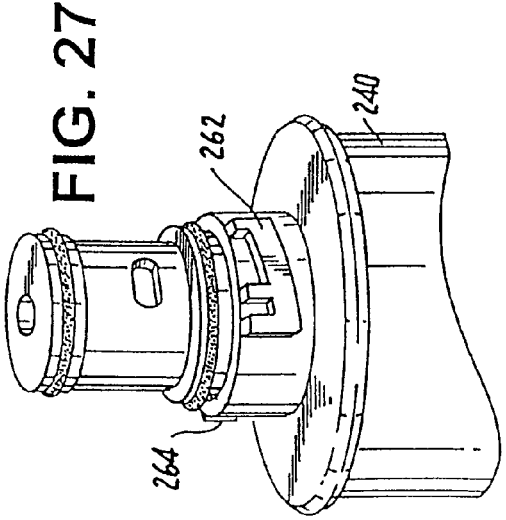
Figure 38:
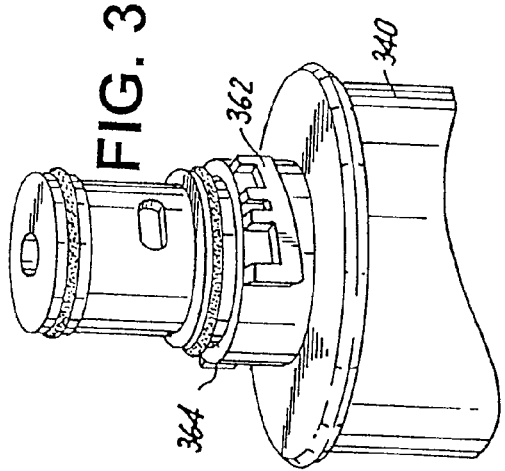
Figure 37:
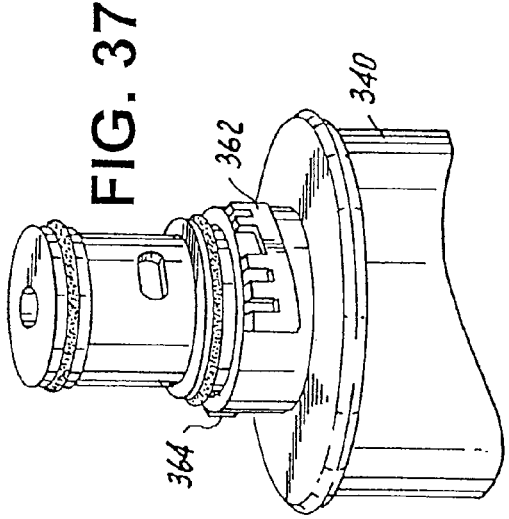
Figure 36:
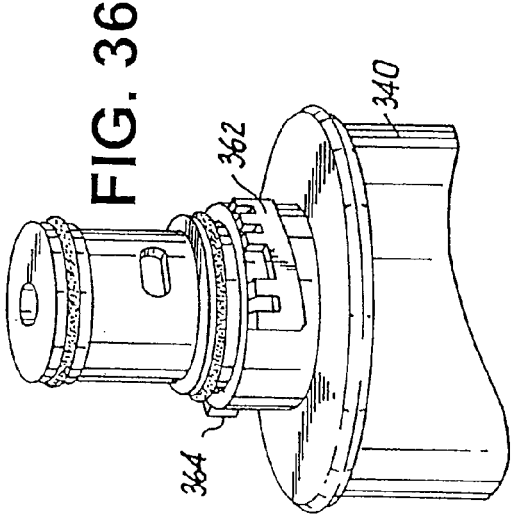
Figure 40:
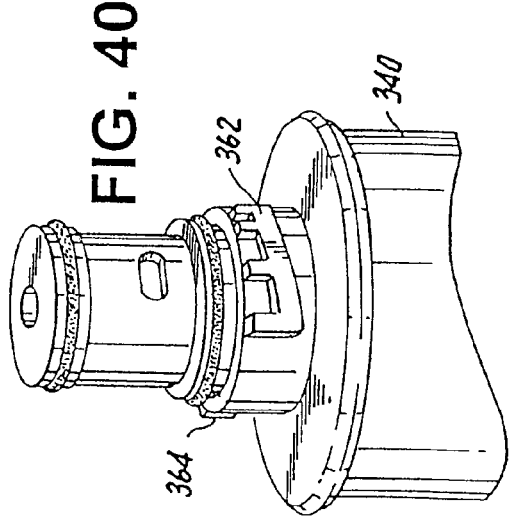
Figure 39:
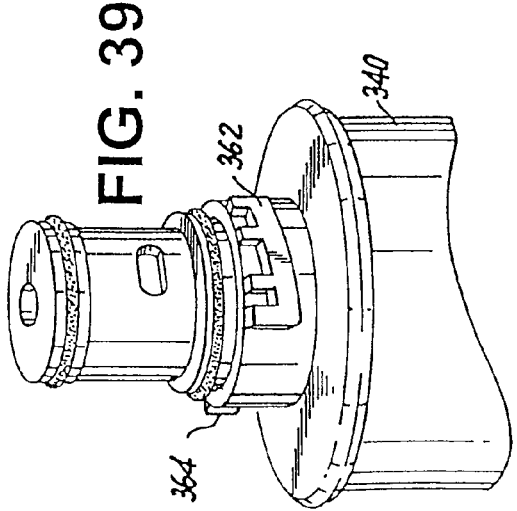
Figure 45:
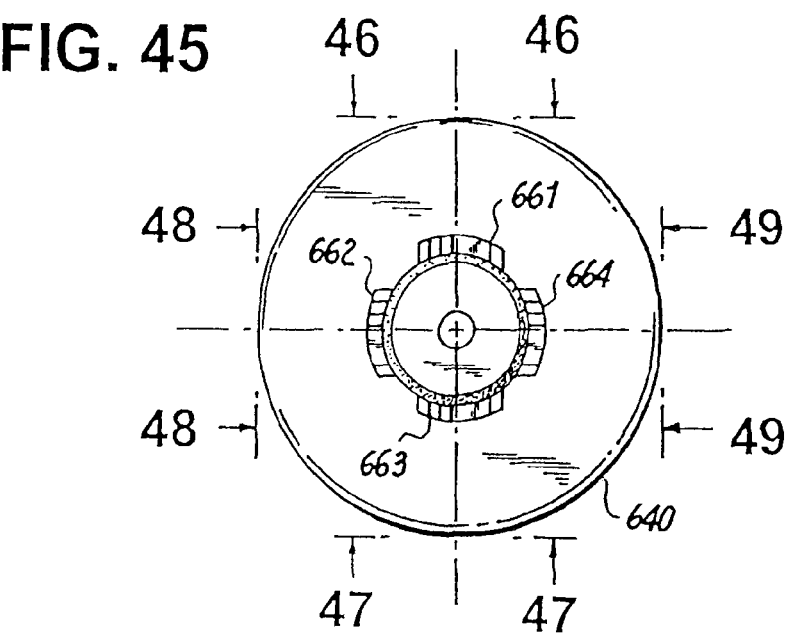
FIG. 45 is a top plan view of the representative neck portion of a representative filter cartridge constructed in accordance with a preferred representative embodiment of the present disclosure which includes two sets of diametrically opposed camming lugs positioned at two different levels on the representative neck portion of the cartridge.
Figure 46:
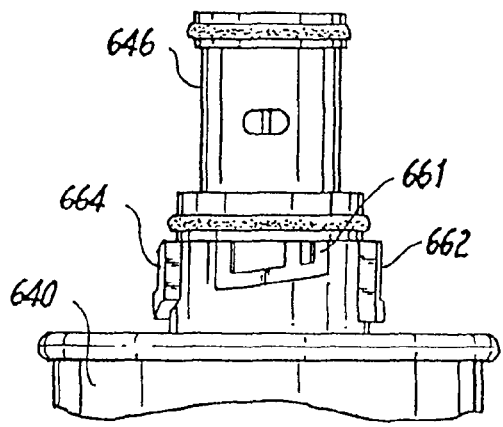
FIG. 46 is a side elevational view of the representative neck portion of the representative filter cartridge of FIG. 45, taken along line 46-46.
Figure 47:
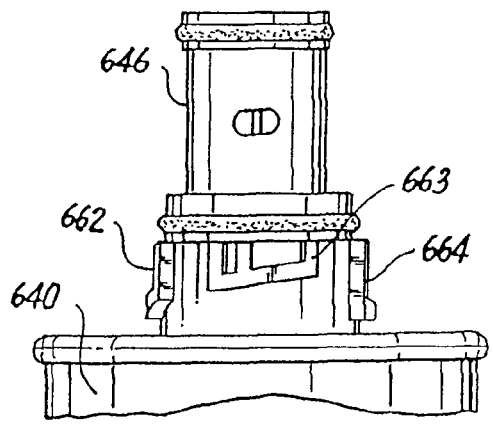
FIG. 47 is a side elevational view of the representative neck portion of the representative filter cartridge of FIG. 45, rotated 90° from the view shown in FIG. 46.
Figure 48:
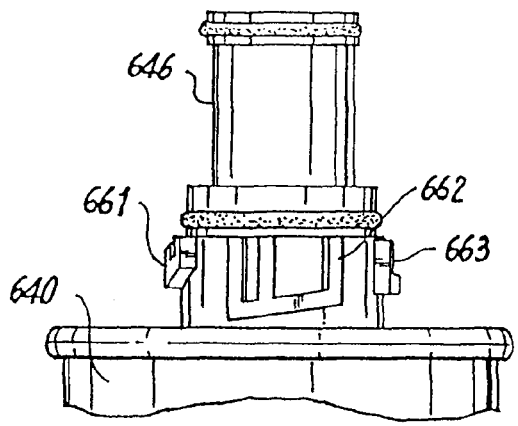
FIG. 48 is a side elevational view of the representative neck portion of the representative filter cartridge of FIG. 45, rotated 90° from the view shown in FIG. 47.
Figure 49:
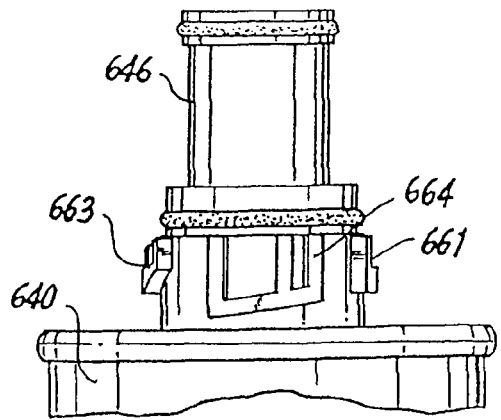
FIG. 49 is a side elevational view of the representative neck portion of the representative filter cartridge of FIG. 45, rotated 90° from the view shown in FIG. 48.

The key formation shown in the exemplary representative embodiment of FIGS. 3-11, corresponds to the key formation illustrated in FIG. 22, which is selected from a group of key formations having five available tooth positions. In the exemplary representative embodiment, the first, fourth and fifth teeth are present, while the second and third teeth are absent. Using the convention wherein the numeral "1" represents the presence of a tooth in a position of a key formation, and the numeral "0" represents the absence of a tooth in a position of the key formation, the key formation illustrated in FIGS. 3-11, and 22 may be represented by the numerical expression (1, 0, 0, 1, 1).

In accordance with a preferred representative embodiment of the subject disclosure, there exists a replacement cartridge that is provided with cam lugs having a surface formation that is compatible with a rotary valve member regardless of the number of recesses defined within the recessed areas formed therein. A cartridge having a neck portion with diametrically opposed cam lugs that include such a formation referred to herein as a skeleton key formation, is illustrated in FIGS. 2 and 12 and is designated generally by reference numerals 40 and 140 respectively.

Figure 12:
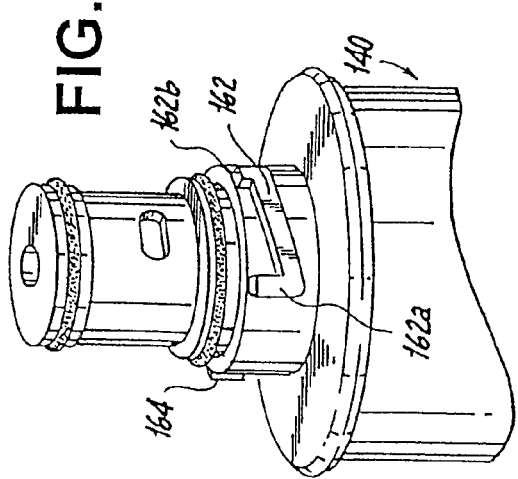
FIG. 12 is a perspective view of the representative cylindrical neck portion of the representative filter cartridge of the present disclosure, which includes camming lugs having a skeleton key formation.
Figure 13:
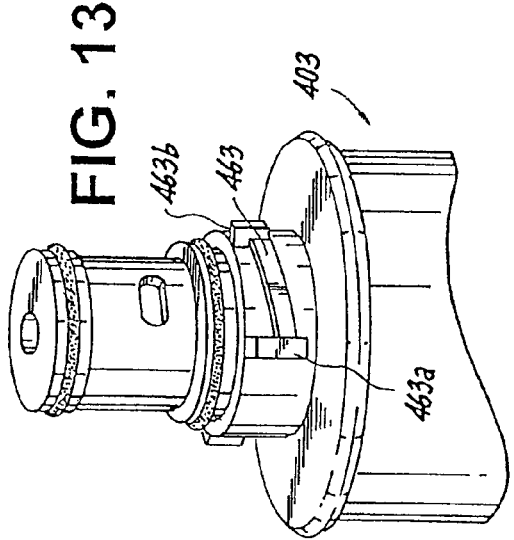
FIGS. 13-17 illustrate a variety of different key configurations provided on the camming lugs formed on the representative cylindrical neck portion of the representative filter cartridge of the present disclosure.
Figure 14:
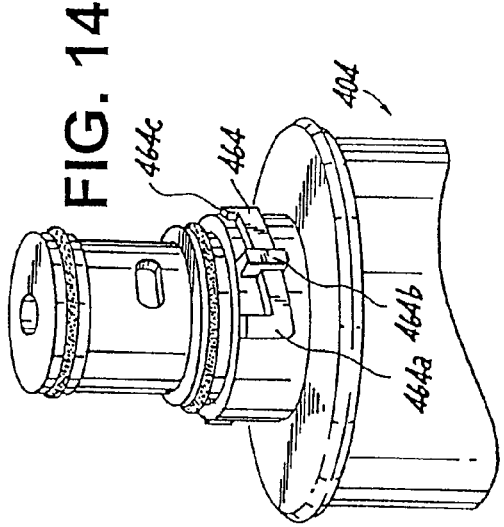

Referring to FIG. 12, the cam lugs 162 and 164 of filter cartridge 140 includes a skeleton key formation defined by a tooth formation wherein only the first and fifth tooth positions are filled with teeth (i.e., teeth 162*a*, 162*b*). This skeleton key is represented by the numerical expression (1, 0, 0, 0, 1). It should be understood that, in a five position key formation, the first and fifth position will always be filled, and, conversely, the recessed areas of the valve member will always have a recess located in the complementary positions.

Table 2 below, sets forth the available tooth combinations for the five position key formation associated with the opposed cam lugs 162 and 164 of filter cartridge 140 and illustrated in FIGS. 3-11 and 21-27. In total, excluding the skeleton key formation of FIG. 12, there are seven available tooth configurations for a five position key formation. Table 1 below sets forth the available tooth configurations for the four position key formation associated with the opposed cam lugs 262 and 264 of filter cartridge 240 illustrated in FIGS. 18-20. In total, excluding the skeleton key formation which is not shown and is represented by the numerical expression (1, 0, 0, 1) there are three available tooth configurations for a four position key formation. Table 3 sets forth the available tooth configurations for the six position key formation associated with the opposed cam lugs 362 and 364 of replaceable filter cartridge 340 as illustrated in FIGS. 28-41. In total, excluding the skeleton key formation which is not shown and is represented by the numerical expression (1, 0, 0, 0, 0, 1) there are fifteen available tooth configurations for a six position key formation.

TABLE 1

| Tooth Configurations (Four Positions) | Figure |
|---|---|
| 1, 1, 1, 1 | 18 |
| 1, 1, 0, 1 | 19 |
| 1, 0, 1, 1 | 20 |

TABLE 2

| Tooth Configurations (5 positions) | Figure |
|---|---|
| 1, 1, 1, 1, 1 | 21 |
| 1, 0, 0, 1, 1 | 22 |
| 1, 0, 1, 0, 1 | 23 |
| 1, 1, 0, 1, 1 | 24 |
| 1, 1, 1, 0, 1 | 25 |
| 1, 0, 1, 1, 1 | 26 |
| 1, 1, 0, 0, 1 | 27 |

TABLE 3

| Tooth Configurations (6 positions) | Figure |
|---|---|
| 1, 1, 1, 1, 1, 1 | 28 |
| 1, 1, 0, 0, 0, 1 | 29 |
| 1, 1, 1, 0, 0, 1 | 30 |
| 1, 1, 1, 1, 0, 1 | 31 |
| 1, 0, 0, 0, 1, 1 | 32 |
| 1, 0, 0, 1, 1, 1 | 33 |
| 1, 0, 1, 1, 1, 1 | 34 |
| 1, 1, 0, 0, 1, 1 | 35 |
| 1, 1, 0, 1, 1, 1 | 36 |
| 1, 1, 1, 0, 1, 1 | 37 |
| 1, 0, 1, 1, 0, 1 | 38 |
| 1, 1, 0, 1, 0, 1 | 39 |
| 1, 0, 1, 0, 1, 1 | 40 |
| 1, 0, 1, 0, 0, 1 | not shown |
| 1, 0, 0, 1, 0, 1 | not shown |

In summary, the number of available tooth combinations "N" for a given tooth configuration having "n" tooth positions can be expressed mathematically as follows:

$$N = 2^{n-2} - 1$$

The relatively large number of key configuration that are available though the keyed system of the subject disclosure will give original equipment manufactures the ability to provide customized filters for each of their appliances. Thus, each manufacturer could offer a unique set of replacement filter cartridge, with each cartridge in the set having a different keyed surface formation provided on the camming lugs thereof, for mating with corresponding reception areas in a valve member supported within a particular type of appliance.

Figure 15:
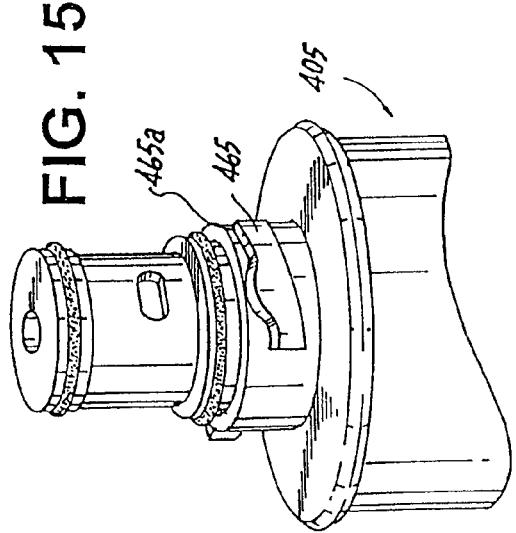
Figure 16:
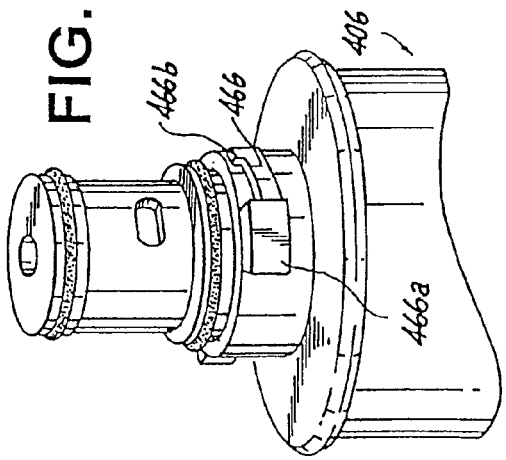
Figure 17:
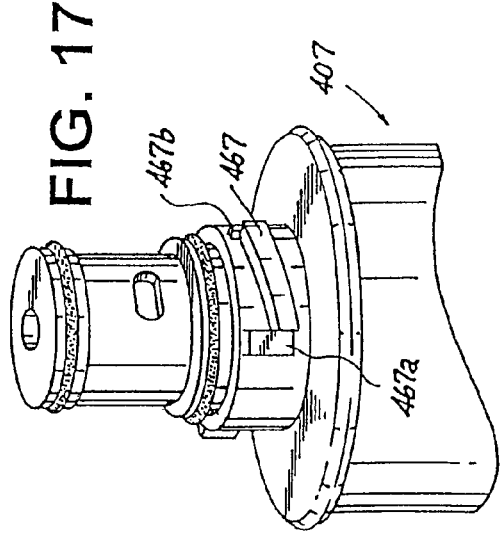
Figure 18:
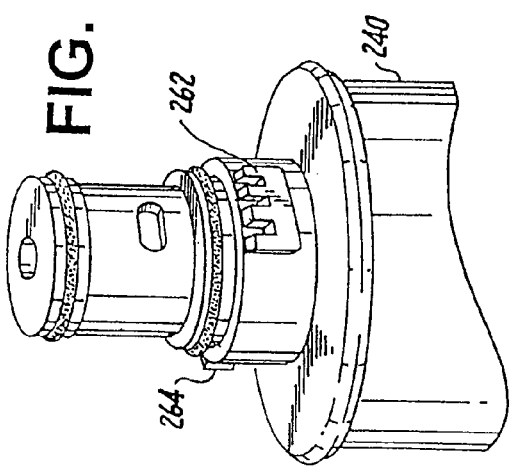
FIGS. 18-20 illustrate each of the available key patterns for a representative camming lug having a maximum of four teeth positions.
Figure 19:
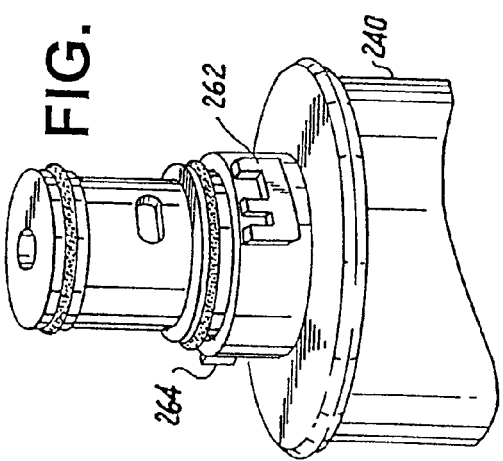
Figure 20:
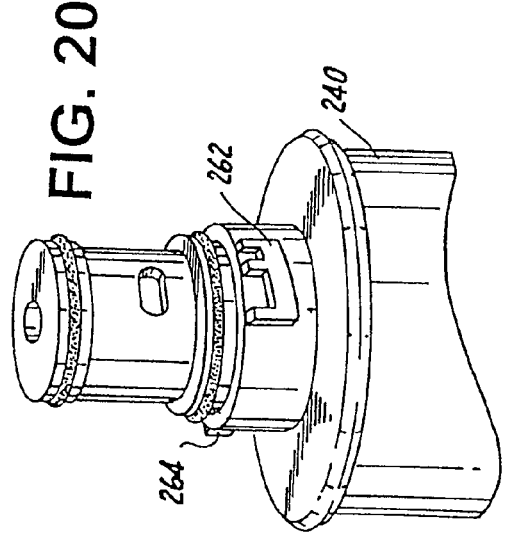
Figure 21:
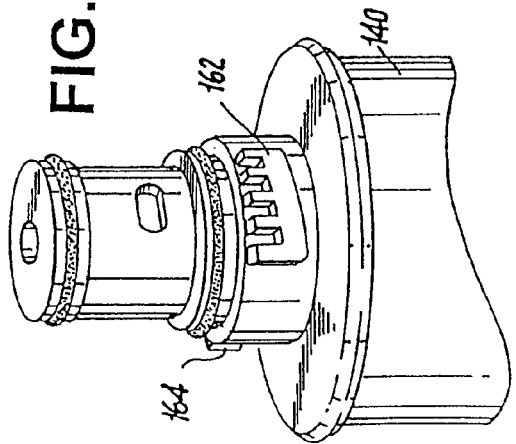
FIGS. 21-27 illustrate each of the available key patterns for a representative camming lug having a maximum of five teeth positions.

Referring to FIGS. 13-17, there are illustrated a series of replacement filter cartridges constructed in accordance with a preferred representative embodiment of the subject disclosure each having a different keyed surface formation associated therewith. For example, FIGS. 13, 14, 16 and 17 illustrate filter cartridges 403, 404, 406, and 407, respectively, with cam lugs 463, 464, 466 and 467 having keyed surface formations with portions that project both radially outwardly from the lugs as well as in an axial direction. For example, cam lug 463 in FIG. 13 includes two teeth 463*a*, 463*b* which project axially and radially from the lug. Cam lug 464 in FIG. 14 includes two axially projecting teeth 464a and 464c and one tooth 464b that project both radially and axially. FIG. 16 illustrates a cam lug 466 having an enlarged radially and axially projecting tooth 466a and a smaller axially projecting tooth 466b. Cam lug 467 in FIG. 17 includes two axially projecting teeth 467a and 467b and the majority of the cam lug itself project radially outwardly from the neck portion of the filter cartridge 407. In accordance with the subject disclosure, it follows that a compatible rotary valve member would have recessed areas with mating features that correspond to the radially and axially extending keyed surface formations of cam lugs 463, 464, 466 and 467.

FIG. 15, illustrates another replacement filter cartridge 405 constructed in accordance with a preferred representative embodiment of the subject disclosure wherein the keyed surface formation provided on the cam lug 465 thereof is defined by a curved surface 465a. In accordance with the subject disclosure, a compatible valve member for filter cartridge 405 would have reception areas with corresponding curved recesses to ensure compatibility with cartridge 405.

Referring to FIGS. 41-44, there is illustrated another replacement filter cartridge constructed in accordance with a preferred representative embodiment of the subject disclosure and designated generally by reference numeral 540. Filter cartridge 540 includes three cam lugs 561, 562 and 563 that are circumferentially spaced apart about the periphery of neck portion 546. Each cam lug has a keyed surface formation thereon for mating with a corresponding recessed area of a compatible rotary valve member 26. As illustrated in FIGS. 42-44, the keyed surface formations of cam lugs 561-563 are derived from a five tooth configuration (see Table 2), and each cam lug has a different key pattern formed thereon. In particular, cam lug 561 has a first keyed surface formation that may be represented by the numerical expression (1, 0, 1, 0, 1), cam lug 562 has a second keyed surface formation that may be represented by the numerical expression (1, 0, 0, 1, 1), and cam lug 563 has a third keyed surface formation that may be represented by the numerical expression (1, 1, 0, 0, 1). It is also envisioned that cam lugs 561-563 could each have the same keyed surface formation provided thereon.

Referring to FIGS. 45-49, there is illustrated another replacement filter cartridge constructed in accordance with a preferred representative embodiment of the subject disclosure and designated generally by reference numeral 640. Filter cartridge 640 includes two sets of diametrically opposed cam lugs that include cam lugs 661-664. The first set of opposed cam lugs 661, 663 are positioned at a first axial height on neck portion 646, and the second set of opposed cam lugs 662, 664 are positioned at a second axial height on neck portion 646. In addition, each cam lug has a keyed surface formation thereon for mating with a corresponding recessed area of a compatible rotary valve member 26. As illustrated in FIGS. 46-49, the keyed surface formations of cam lugs 661-664 are derived from a five tooth configuration (see Table 2). Cam lugs 661 and 664 have the same keyed surface formation thereon that may be represented by the numerical expression (1, 0, 0, 1, 1), while cam lugs 662 and 663 both have another keyed surface formation thereon that may be represented by the numerical expression (1, 1, 0, 0, 1). It is also envisioned that cam lugs 661-664 could each have the same keyed surface formation provided thereon, or, in the alternative, each cam lug could have a different keyed surface formation provided thereon.

Referring to FIGS. 50-51, there is illustrated another filter assembly constructed in accordance with a preferred representative embodiment of the subject disclosure and designated generally by reference numeral 700. Filter assembly 700 includes a head portion 720 enclosing a rotary valve member 726 that has a mechanism for minimizing leakage during cartridge replacement. The mechanism includes a floating check-ball 728 and an associated valve seat 730. As shown in FIG. 51, during normal service, when process fluid is flowing through the system, the outlet flow pressure of the filtered fluid causes the check-ball 728 to remain in an unseated position. In contrast, when the neck portion 46 of a replacement filter cartridge 40 is removed from the interior bore of valve member 726, and the outlet flow pressure is terminated, the check-ball 728 becomes seated in valve seat 730, as shown in FIG. 51. As a result, the void volume within head portion 720 is restricted from flowing out of valve member 726.

Figure 52:
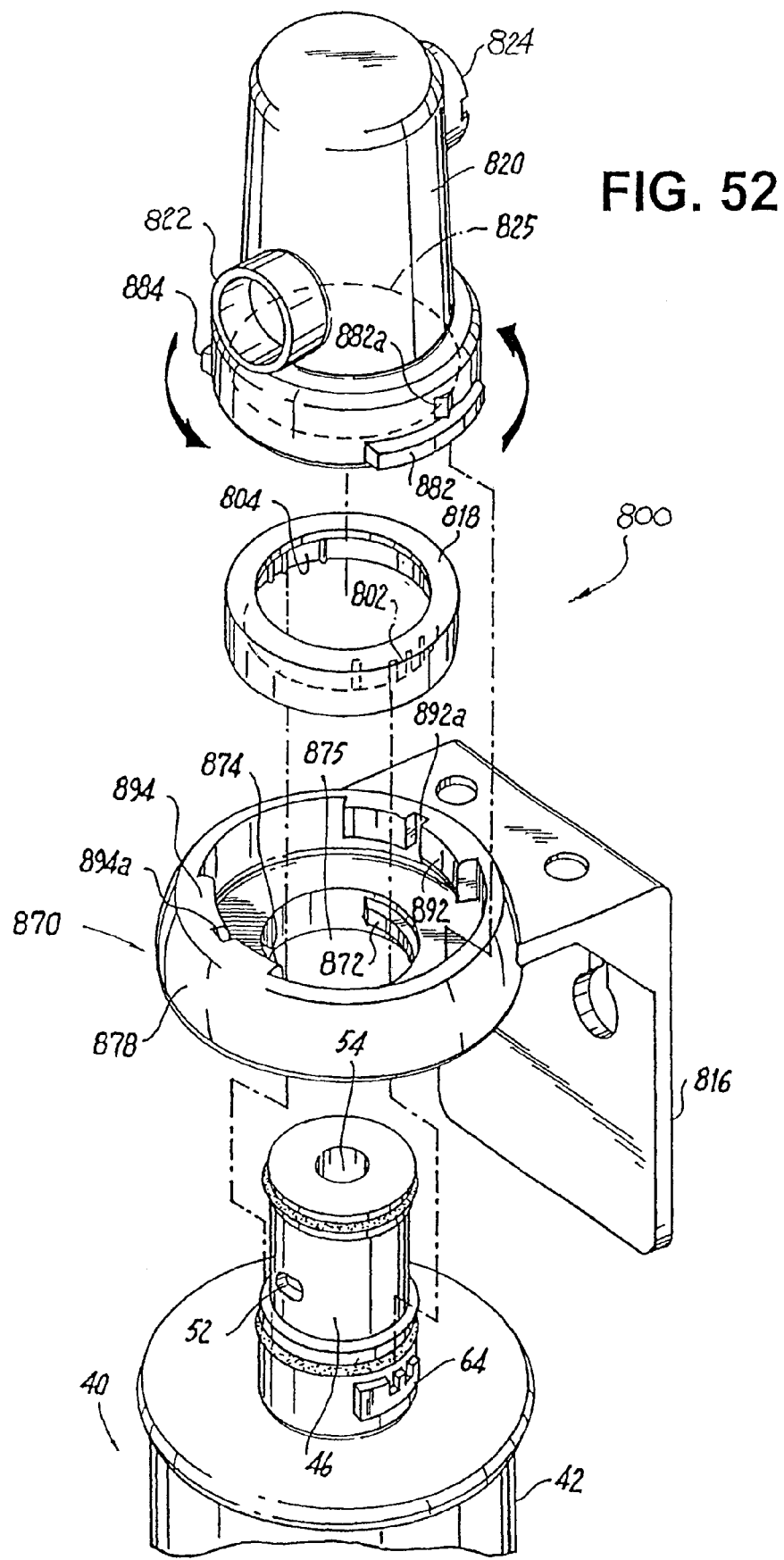
FIG. 52 is an exploded perspective view of another representative filter assembly constructed in accordance with a representative preferred embodiment of the present disclosure with the parts thereof separated for ease of illustration, including an annular insert in the form of a key ring having recesses designed to mate with corresponding surface features on the keyed cam lugs of a replacement filter cartridge.
Figure 53:
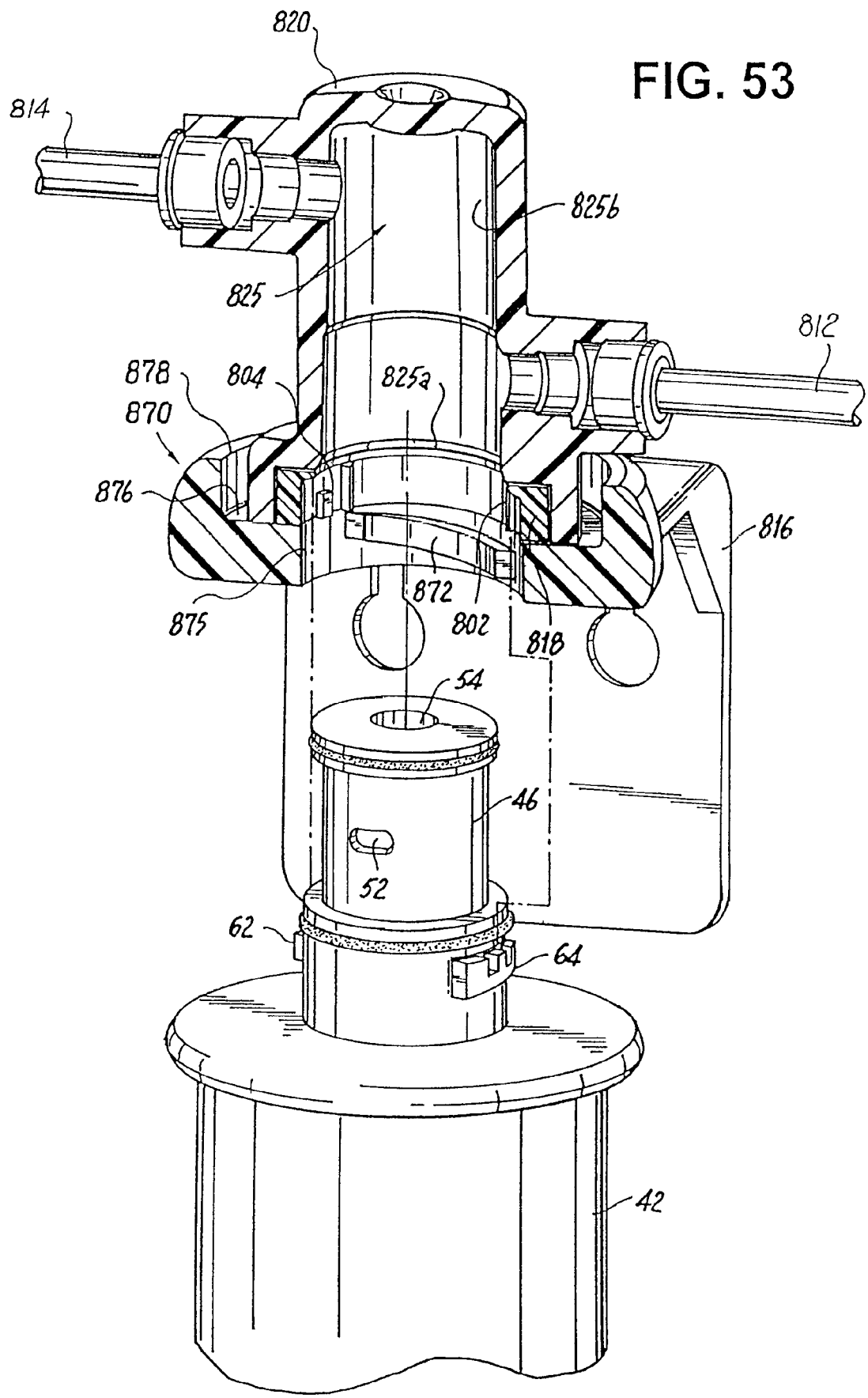
FIG. 53 is a perspective view of the representative filter assembly of the FIG. 52 with the head portion in cross-section to illustrate the interior structure thereof.

Referring now to FIGS. 52-53, there is illustrated another filter assembly constructed in accordance with a preferred representative embodiment of the subject disclosure and designated generally by reference numeral 800. Filter assembly 800 differs from the previously described representative embodiments of the subject disclosure in that the assembly does not include a rotary valve member, such as the valve member 18 of filter assembly 10. Instead, as best seen in FIG. 53, filter assembly 800 includes a head portion 820 with an interior bore 825 having a lower region 825a configured to support an annular insert in the form of a key ring 818. Key ring 818 defines diametrically opposed reception areas 802, 804 for mating with corresponding keyed surface formations on the cam lugs 62, 64 formed on the neck portion 26 of a replacement filter cartridge 40, for example. In accordance with the subject disclosure, to ensure the integrity of the system with which filter assembly 800 is associated, a compatible replacement cartridge must have cam lugs with keyed surface formations that mate with the recessed areas of the key ring 818.

Referring to FIG. 52, filter assembly 800 further includes a mounting bracket 816 having a support flange 870 depending therefrom for facilitating rotational engagement of a replacement filter cartridge 40 with head member 820 and the associated key ring 818. A central aperture 875 extends through support flange 870 to receive the neck 46 of filter cartridge 40, and a pair of diametrically opposed cam raps 872 and 874 project radially into central aperture 875 for operatively interacting with the inclined lower surfaces of cam lugs 62, 64 when filter cartridge 40 is engaged with head portion 820. Support flange 870 further includes a recessed seating area 876 defined by an annular retaining wall 878 configured to receive and retain the head portion 820. More particularly, head portion 820 includes a pair of diametrically opposed ramped cam struts 882 and 884 for operatively engaging a pair of diametrically opposed retention flanges 892 and 894 projecting radially inwardly from the retaining wall 878. In addition, ratchet nibs 882a and 884a project outwardly from the lower region of head portion 820 for engagement within corresponding notches 892a and 894a formed in retention flanges 892 and 894, respectively. Those skilled in the art will readily appreciate that the way in which head portion 820 and support flange 870 interact and engage may also be employed in conjunction with the filter assembly 10 described hereinabove, whereby head portion 20 and support flange 70 would be adapted and configured to interact and engage in a substantially similar manner.

To assemble the filter assembly 800 of the subject disclosure, a key ring 818 having particular configuration of recesses, which may be selected from a set of key rings each having different recess configurations, is first inserted into the lower region 825a of interior bore 825 of head potion 820.

The head portion is then rotatably engaged within the seating area 876 of support flange 870. Thereafter, a filter cartridge 40 is brought into approximation with the head portion 820 by inserting the neck portion 46 of the cartridge through the central aperture 875 of support flange 870, allowing the camming lugs 62, 64 to pass between the opposed cam ramps 872, 874 projecting radially into aperture 875. At such a time, the keyed surface formations of the cam lugs 62, 64 mate with the corresponding recessed areas 802, 804 in key ring 818, provided of course that the cartridge and key ring are compatible with one another. Once the cam lugs 62, 64 are mated with the recessed areas 802, 804, the filter cartridge 40 is rotated through an arc of approximately 90°, such that the inclined lower surfaces of cam lugs 62, 64 translate relative to cam ramps 872, 874. This relative movement causes the key ring 818 to rotate within interior bore region 825a and causes the neck portion 46 of filter cartridge 40 to move axially into the upper region 825b of the interior bore 825 of head portion 820, until such time as the neck portion of the filter cartridge is sealingly received therein.

It should be noted that provision is made such that key ring 818 will rotate through a limited travel range relative to the head portion 820 as filter cartridge 40 is rotated into engagement with head portion 820. Furthermore, since a rotary valve member is not utilized with head portion 820, the upper region 825b of interior bore 825 is dimensioned and configured to directly mate with the neck portion 46 of filter cartridge 40, such that the inlet port 52 in neck portion 46 is in direct fluid communication with the radial inlet port 812 of head portion 820 and the axial outlet port 54 in neck portion 46 is in direct fluid communication with the radial outlet port 814 of head portion 820.

Referring now to FIGS. 54-64, there is illustrated yet another filter assembly constructed in accordance with a preferred representative embodiment of the subject disclosure and designated generally by reference numeral 900. Similarly to filter assembly 10, filter assembly 900 is configured for use in conjunction with a fluid processing system that includes an inlet conduit 912 for delivering unfiltered process fluid into the filter assembly and an outlet conduit 914 for delivering filtered process fluid from the filter assembly 900. Filter assembly 900 is preferably mounted to a supporting structure associated with the fluid processing system by a bracket 916.

Figure 54:
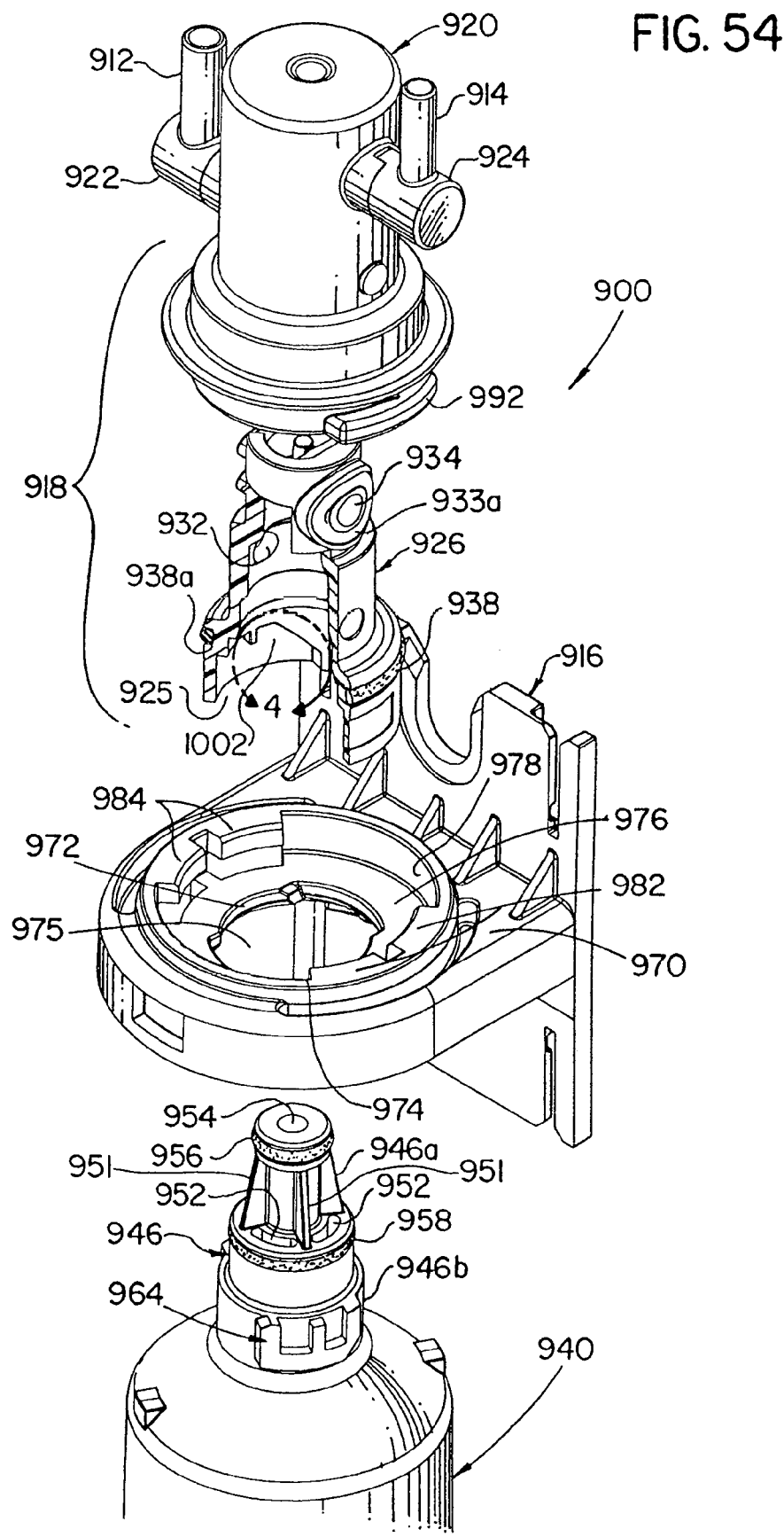
FIG. 54 is an exploded perspective view of another representative filter assembly constructed in accordance with a preferred embodiment of the present disclosure with the parts separated for ease of illustration, which includes a valve member that may be rotated relative to a representative head portion of the representative filter assembly between an open position wherein fluid is permitted to flow through the representative filter assembly and a bypass position wherein unrestricted fluid flows through the filter head from inlet to outlet.
Figure 55:
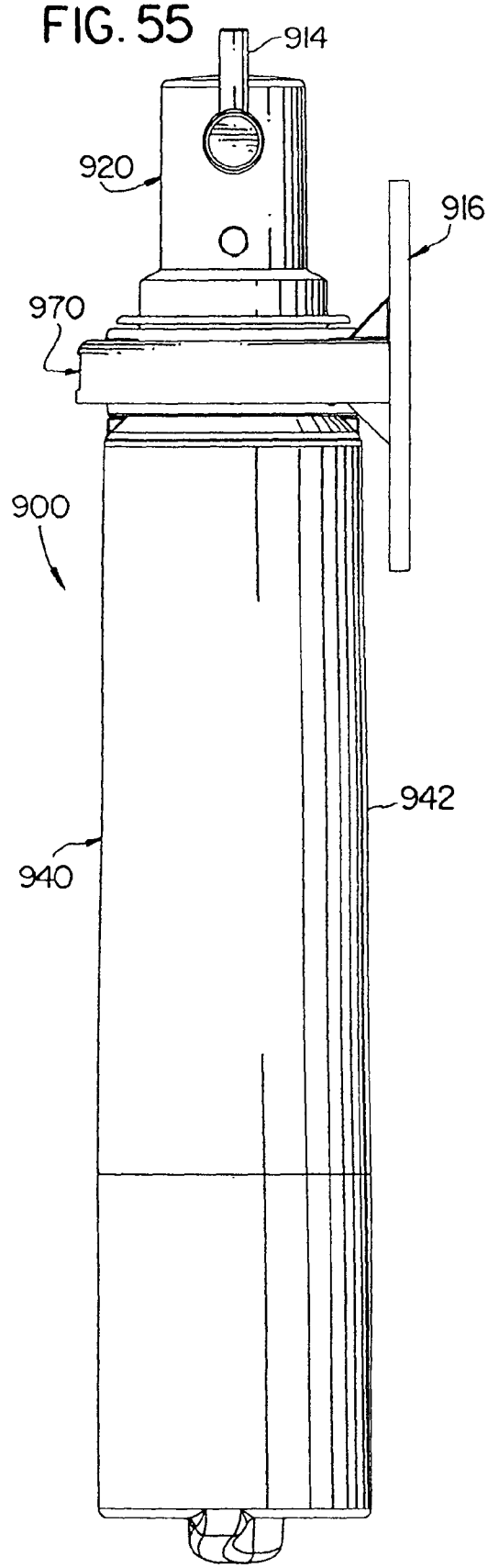
FIG. 55 is a perspective view of the assembled representative filter assembly of FIG. 54.

Referring to FIG. 54, filter assembly 900 includes a unique rotary valve assembly 918 that includes a head portion 920 defining an interior chamber having an inlet port 922 for communicating with inlet conduit 912 and an outlet port 924 for communicating with outlet conduit 914. Rotary valve assembly 918 further includes a valve member 926 configured for reception within the interior chamber of head portion 920 in such a manner so as to facilitate rotation of the valve member 926 relative to the head portion 920 between an open position wherein fluid is permitted to flow through the filter assembly and a bypass position wherein unrestricted fluid flows through the filter head from inlet to outlet. (See FIGS. 59-60).

Valve member 926 includes an inlet orifice 932 for communicating with the inlet port 922 of head portion 920 and an outlet orifice 934 for communicating with the outlet port 924 of head portion 920. (See FIG. 61) The body of valve member 926 includes a recess 931a, shown in FIG. 61, surrounding the inlet orifice 932 for accommodating an O-ring seal 931, also shown in FIG. 61, which serves to facilitate fluid-tight junction of the inlet orifice 932 and the inlet port 922. The valve member 926 also has a recess 933a surrounding the outlet orifice 934 for accommodating an O-ring seal 933, shown in FIG. 61, which serves to facilitate fluid-tight junction of the outlet orifice 934 and the outlet port 924. The body of the valve member 926 further includes a recess 938a for accommodating an O-ring seal 938 (See FIGS. 61-64). The O-ring seal 938 serves to facilitate sealing engagement of the valve member 926 within the interior chamber of head portion 920 and to prevent leakage of the process fluid to atmosphere.

With continuing reference to FIG. 54, filter assembly 900 further includes a replaceable filter cartridge 940 constructed in accordance with a preferred representative embodiment of the subject disclosure. Filter assembly 900 is adapted and configured to ensure that replacement cartridge 940 is compatible with the fluid processing system with which it is associated. Moreover, as discussed hereinbelow, the filter cartridge 940 and valve member 926 are provided with keyed mating structures that ensure compatibility therebetween, and thus prevent the accidental or intentional installation of an incompatible or inferior replacement cartridge, which could jeopardize the integrity of the fluid processing system.

Referring to FIGS. 54-56 and 61, replaceable filter cartridge 940 includes a generally cylindrical body portion 942 enclosing filter media for filtering process fluid. Those skilled in the art will readily appreciate that any one of a variety of different types of filter media could be enclosed within the body portion including, for example, pleated media, microfibers or carbon media. The body portion 942 includes a top cap 944, which preferably forms an integral part of the body portion 942. Alternatively, those skilled in the art will readily appreciate that the top cap 944 and body portion 942 may be formed separately and then joined together by sonic welding, spin welding or other similar methods known in the art. The top cap 944 has a neck portion 946 depending therefrom. The neck portion 946 of filter cartridge 940 is adapted and configured for reception within the interior cavity of valve member 926 (See FIGS. 54, 56, 58-61) and includes an upper section 946a and a lower portion 946b.

Referring again to FIG. 54, the neck portion 946 defines a plurality of axial passages 952. The upper section 946a preferably also defines a plurality of sloped axially-aligned protrusions 951, which project radially outwardly from the upper section 946a, for dividing the flow of fluid entering the axial passages 952. Thus, in an exemplary preferred representative embodiment of the subject disclosure, unfiltered process fluid enters the interior chamber of the valve member 926 through the inlet orifice 932, flows between the protrusions 951 and through the axial passages 952, and then enters the body portion 942 (see FIG. 55) of the filter cartridge 940. The upper section 946a further defines an axial outlet passage 954 for delivering filtered process fluid from the interior of body portion 942 to the interior cavity of valve member 926 for egress through the outlet orifice 934 and the port 924 out of the head portion 920.

Those skilled in the art will readily appreciate that the direction/orientation of the inlet and outlet passages in the neck portion 946 could be reversed. The inlet and outlet passages 952 and 954 are sealingly isolated from one another by an upper O-ring seal 956 positioned at the upper end of neck portion 946 (see FIG. 61). A second lower O-ring seal 958 is positioned below the inlet of the radial passages 952 to sealingly engage the neck portion 946 within the interior chamber of the valve member 926 and prevent the leakage of unfiltered process fluids from filter assembly 900 while in operation.

Figure 56:
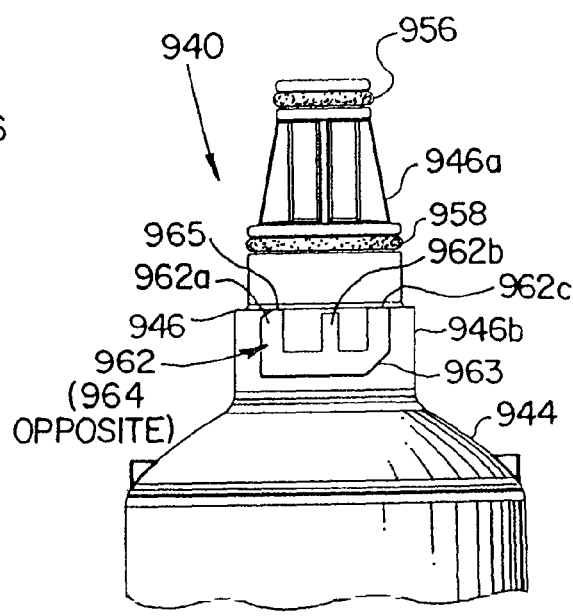
FIG. 56 is an enlarged perspective view of the upper portion of the replaceable filter cartridge shown in FIGS. 54-55, illustrating the structure of the neck portion thereof.
Figure 58:
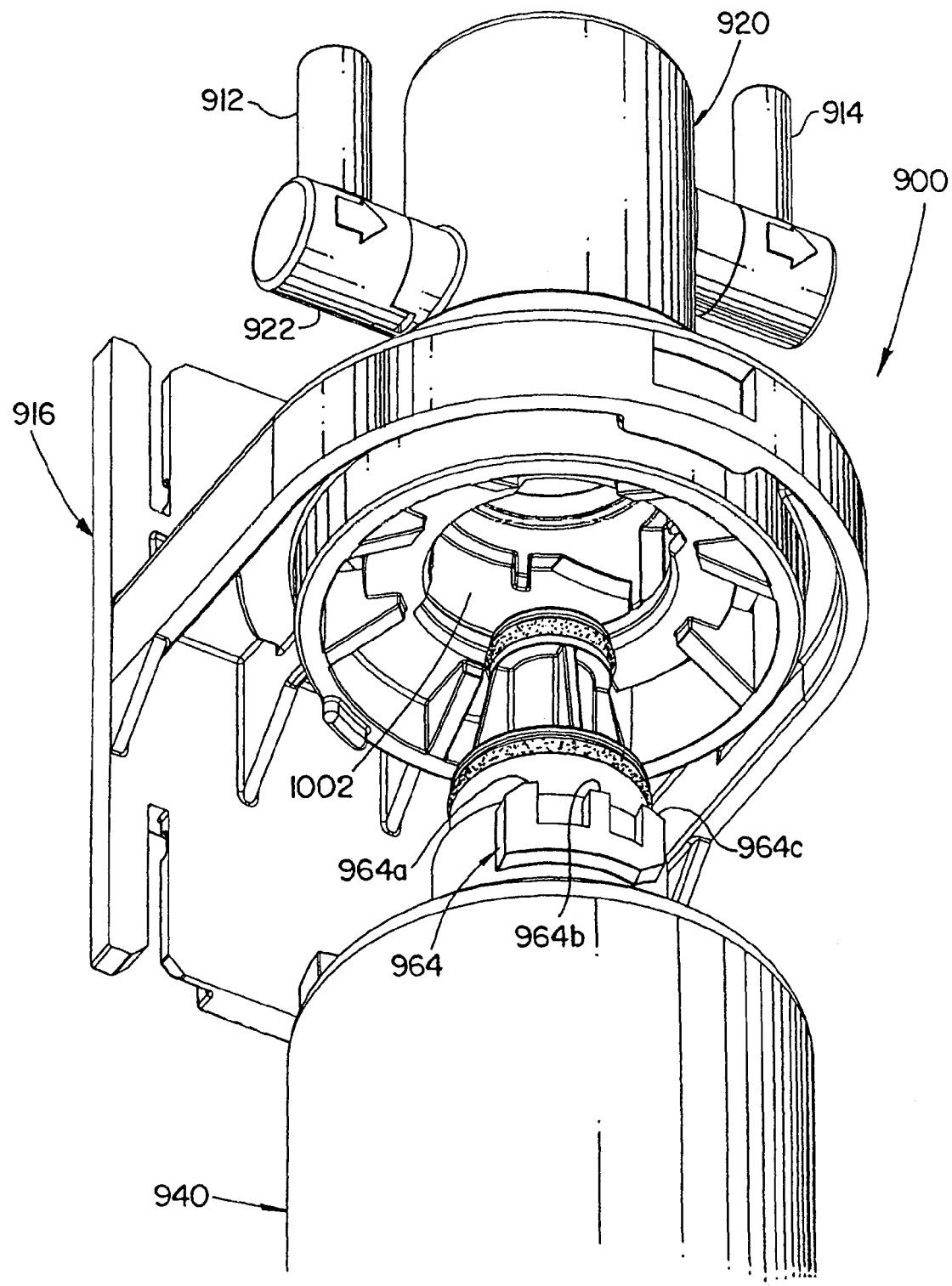
FIG. 58 is an enlarged perspective view of the upper portion of the representative filter assembly of FIG. 54 illustrating the insertion of the representative replaceable filter cartridge into the central aperture formed in the intermediate support flange.

Referring to FIG. 54 in conjunction with FIGS. 56 and 58, a pair of diametrically opposed cam lugs 962 and 964 project radially outwardly from the lower section 946b of neck portion 946. Cam lugs 962 and 964 are dimensioned and configured to facilitate rotational engagement of the filter cartridge within an intermediate support flange 970 that depends from mounting bracket 916. As best seen in FIG. 54, a central aperture 975 extends through support flange 970 for receiving the neck portion 946 of filter cartridge 940. A pair of diametrically opposed cam ramps 972 and 974 project radially into central aperture 975 for interacting with the lower surfaces of cam lugs 962 and 964. The cam ramps 972 and 974 are spaced from one another to allow the cam lugs 962 and 964 to fit therebetween when the neck portion is extended through aperture 975 during assembly. As best illustrated in FIG. 56, each cam lug, 962 and 964, includes a leading inclined surface 963. Leading inclined surface 963 is adapted and configured to facilitate rotational engagement of the filter cartridge with the cam ramps 972 and 974 of the support flange 970, as illustrated in FIGS. 58-60 and 62-64.

Figure 61:
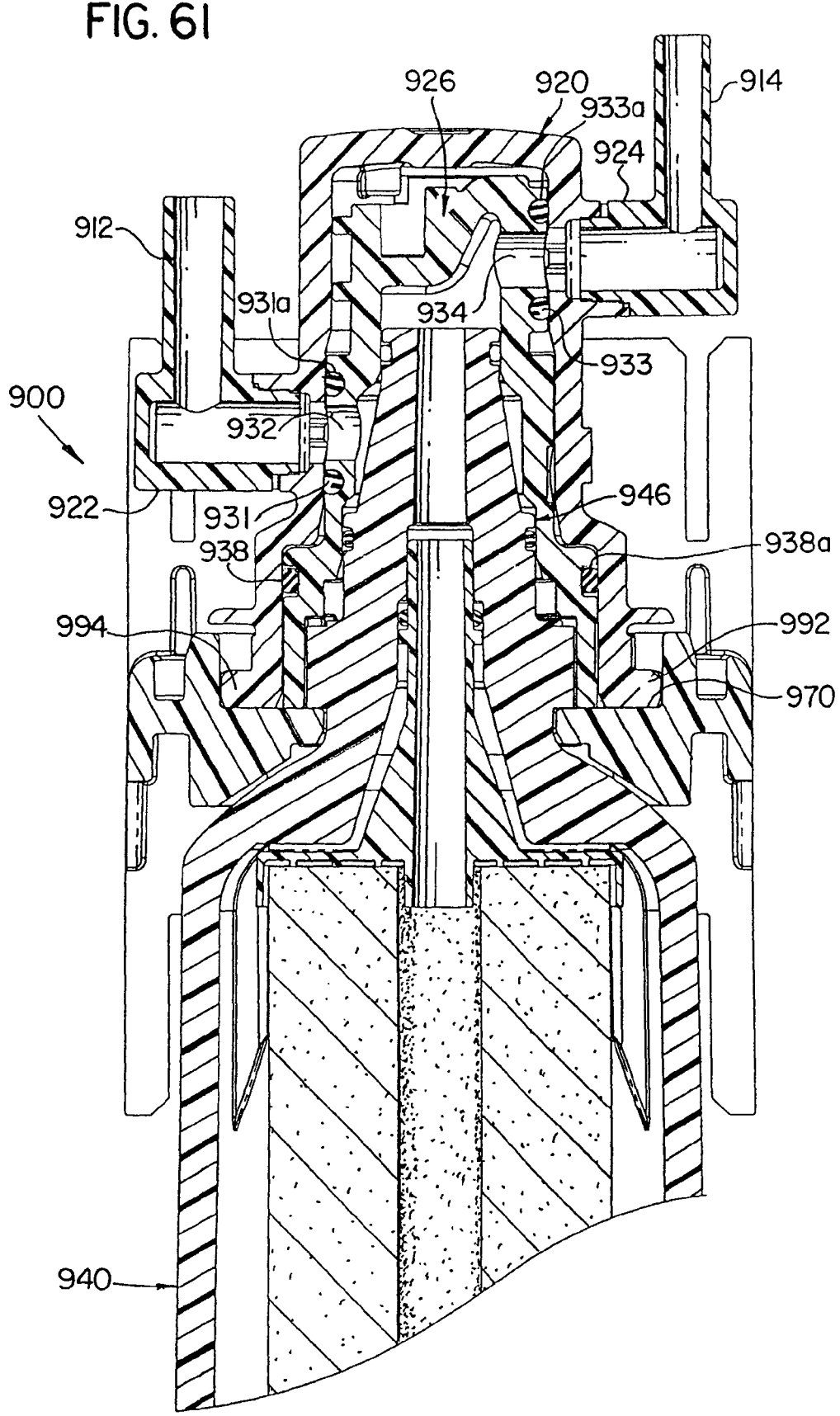
FIG. 61 is a cross-sectional view of the upper portion of the representative filter assembly of FIGS. 54-60 wherein the replaceable representative filter cartridge assembly is shown engaged within valve member and the valve member, in turn, is engaged within the head portion.

Referring to FIGS. 54 and 61, support flange 970 further includes a recessed seating area 976 defined by annular retaining wall 978 and configured to receive and retain the head portion 920 of filter assembly 900. Diametrically opposed arcuate retention ribs 982 and 984 project inwardly from retaining wall 978 to frictionally engage with corresponding engagement struts 992 and 994 (see FIG. 61) that project radially outwardly from the lower region of head portion 920, when the head portion 920 is rotatably engaged within the recessed seating area 976 during assembly. In an alternate representative embodiment of the subject disclosure, the head portion 920 and support flange 970 may be adapted and configured to cooperate and engage with one another in a manner described herein with respect to filter assembly 800 and as illustrated in FIGS. 52-53.

Similarly to filter assembly 10, and as illustrated in FIGS. 1 and 2, the annular retaining wall 978 of support flange 970 may be also configured to accommodate and support a shroud (not shown), such as the shroud 90, for housing and protecting the rotary valve assembly 918 of filter assembly 900. Also in a like manner to cam lugs 62 and 64 of filter assembly 10, see, e.g., FIGS. 2 and 3, cam lugs 962 and 964 (See FIGS. 54 and 56) may be adapted and configured for reception within a pair of corresponding diametrically opposed reception areas 1002 and 1004, best shown in FIG. 57, formed within the interior cavity 925 of valve member 926. As discussed in connection with other preferred representative embodiments of the subject disclosure, the upper surface of each cam lug 962, 964 is provided with a unique key formation having, in this exemplary representative embodiment, a plurality of spaced apart axially projecting teeth that are adapted and configured to engage and mate with a corresponding set of spaced apart recesses formed within the reception areas 1002 and 1004 of the valve member 926. This mating arrangement is designed to ensure replacement cartridge's compatibility by only permitting replacement of a filter cartridge having a keyed surface formation that corresponds to the surface features of the reception areas in the valve member.

Figure 57:
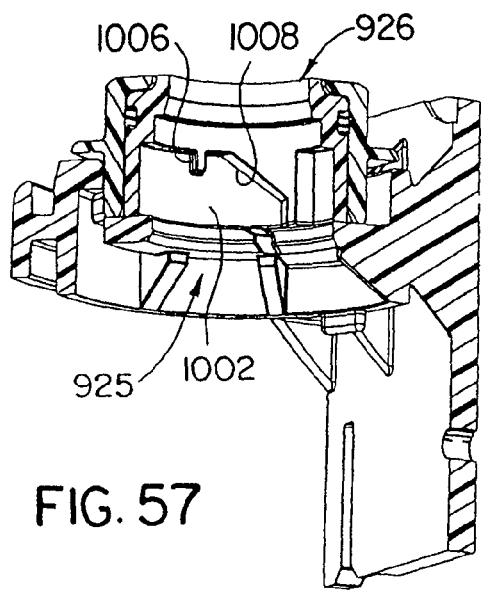
FIG. 57 is an enlarged perspective view of the area designated by the reference number 4 in FIG. 54, illustrating reception structures formed within the interior cavity of the valve member and configured for receiving cam lugs.

In the exemplary representative embodiment of the disclosure illustrated in FIGS. 54-64, the key formation on each cam lug (962, 964) includes three spaced apart teeth (962a-962c, 964a-964c). Other configurations of the key formation may also be used, e.g., those described herein. Referring to FIG. 57, the exemplary representative embodiment shown in FIGS. 54-64, the reception areas, 1002 and 1004, also include a rib member 1006. As discussed in greater detail with respect to filter assembly 10, the two corresponding reception areas would typically include corresponding recesses for each spaced apart tooth formed on the cam lugs. In this exemplary representative embodiment of the subject disclosure, only a single recess is provided with rib member 1006. This configuration for the reception areas is more representative of a skeleton key formation. However, those skilled in the art would readily appreciate that the reception area configurations previously disclosed with respect to alternative embodiments of the present disclosure can be applied to filter assembly 900.

As discussed in greater detail hereinbefore, the number of teeth that define the key formation on each cam lug (962, 964) can vary within the scope of this disclosure (see for example FIGS. 18-40), as can the surface geometry of the key formation (see for example FIGS. 13-17). In each instance, the reception areas (1002, 1004) in the rotary valve member 926 would have a corresponding mating configuration to accommodate the key formation formed on the cam lugs. Furthermore, it is envisioned that the key configuration on one lug could be different from the key configuration of the opposed lug. This will dramatically increase the number of possible key combinations available to a filter manufacturer.

Referring to FIGS. 54-61, when a compatible filter cartridge is introduced into the filter assembly 900, the neck portion 946 of the filter cartridge 940 is inserted through the central aperture 975 of support flange 970, with the cam lugs 962 and 964 positioned between the diametrically opposed cam ramps 972 and 974 (See FIG. 54). At such a time, the valve member 926 should be in the bypass position to receive the neck portion 946 (See FIG. 60). In that position, the inlet and outlet orifices 932, 934 of valve member 926 are not aligned with the inlet and outlet ports 922, 924 of head portion 920. In that configuration, the process fluid entering the inlet port 922 flows into the interior chamber of the head portion 920 and around the outer surface of the valve member 926. Sealing engagement of the valve member 926 within the head portion 920, e.g., facilitated by the O-ring seal 938, prevents leakage of the process fluid flowing around the valve member 926 into atmosphere.

Referring to FIGS. 56, 58 and 62-64, thereupon, the teeth (962a-962c, 964a-964c) forming the keyed engagement surface of cam lugs 962 and 964 are positioned into the corresponding reception areas 1002 and 1004 and are caused to mate therewith. During the insertion of neck portion 946, trailing inclined surfaces 965 (See FIG. 56), which are associated with cam lugs 962 and 964, are adapted and configured for engagement with inclined surfaces 1008 formed in reception areas 1002 and 1004. The formation of trailing and leading inclined surfaces 963 and 965 on cam lug 962 and 964 facilitates the rotational engagement of the filter cartridge 940 with the support flange 970 and the opening of valve member 926.

Figure 60:
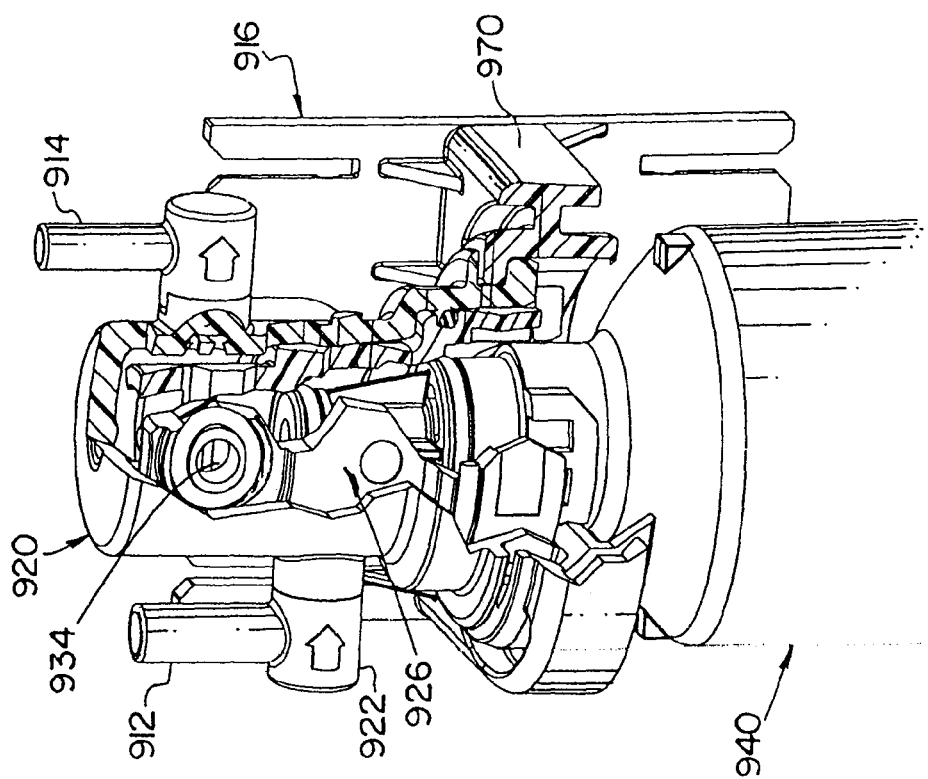
FIG. 60 is an enlarged perspective view of the upper portion of the representative filter assembly of FIG. 54 having a portion of the head portion and of the valve member cut away for ease of illustration, wherein the valve member is in the "bypass" position.
Figure 59:
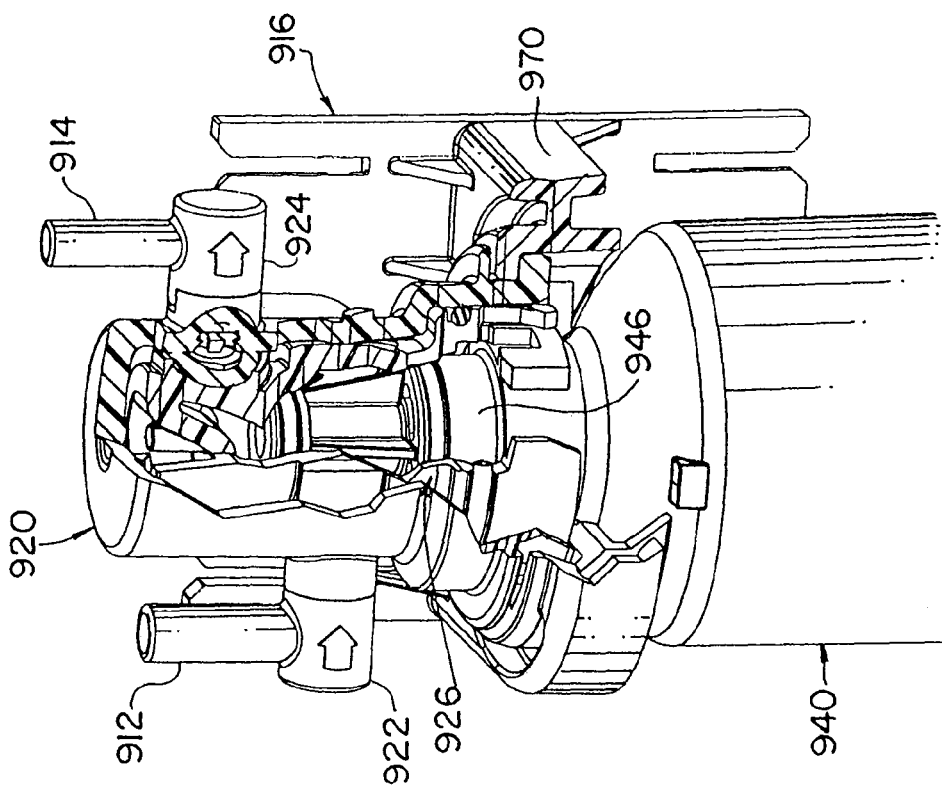
FIG. 59 is an enlarged perspective view of the upper portion of the representative filter assembly of FIG. 54 having a portion of the representative head portion and of the representative valve member cut away for ease of illustration, wherein the representative valve member is in the "filter" position.

Once the neck portion 946 of filter cartridge 940 has been intimately engaged within the interior cavity 925 of valve member 926, the cartridge and valve member may be rotated, e.g., presently preferably, in a counter-clockwise direction from the filter position illustrated in FIG. 59 to the bypass position illustrated in FIG. 60, with respect the support flange 970 and head portion 920. Upon rotating filter cartridge 940 in conjunction with valve member 926, the cam lugs 962, 964 projecting from neck portion 946 translate against the cam ramps 972, 974, causing the filter cartridge 940 to move helically upwardly in an axial direction. As a result, valve member 926 is rotated into the "on" or open position, wherein the inlet and outlet orifices 932, 934 of the valve member 926 are aligned with the inlet and outlet ports 922, 924, respectively, of head portion 920 to allow fluid to flow through the filter assembly 900. FIG. 61 illustrates an assembled filter assembly according to an exemplary preferred representative embodiment of the subject disclosure, wherein filter cartridge 940 is engaged with support flange 970 and valve member 926 is in the open position.

If the cam lugs of a replacement filter cartridge introduced into the system are not configured to mate with the reception areas of the valve member, i.e., if the cam lugs have no keyed surface formation, which may be indicative of an unauthorized after-market filter cartridge, the cam lugs will interfere with and be unable to engage the reception areas in the valve member. Consequently, because the cam lugs 962, 964 will be located below the inclined surfaces of the cam ramps 972, 974, the cam lugs will be unable to traverse the cam ramps. As a result, the cam lugs will be unable to effect rotation of the valve member into the "on" position to permit fluid to flow through the assembly. This will ensure replacement cartridge compatibility by preventing the use of inferior or unauthorized replacement filter cartridges.

Referring now to FIGS. 62-64, which illustrate the interaction of the cam lugs 962, 964 (opposite side, not shown) with the corresponding reception areas 1002 and 1004 formed in the interior cavity of valve member 926. In FIG. 62 the neck portion 946 of filter cartridge 940 is fully inserted into the interior cavity 925 of valve member 926 and cam lugs 962, 964 are positioned within reception areas 1002 and 1004. Upon imparting a clockwise rotation to filter cartridge 940, as shown in FIGS. 63-64, trailing inclined surfaces 965 contact inclined surfaces 1008 formed in reception areas 1002, 1004 and slide along the inclined surfaces 1008, so that filter cartridge 940 is forced in a downward direction until it is disengaged from within the interior cavity 925 of valve member 926. At the same time, valve member 926 rotates from an open position to a "bypass" position within head portion 920. Conversely, upon insertion of filter cartridge 940 into the interior cavity of valve member 926, trailing inclined surfaces 965 contact the inclined surfaces 1008 formed in reception areas 1002. The inclined surfaces 965 slide along the inclined surfaces 1008 when the filter cartridge 940 is rotated in a counter-clockwise direction, so that filter cartridge 940 is forced to move in an upward direction and engagement with support flange 970 is, thus, facilitated.

Figure 65:
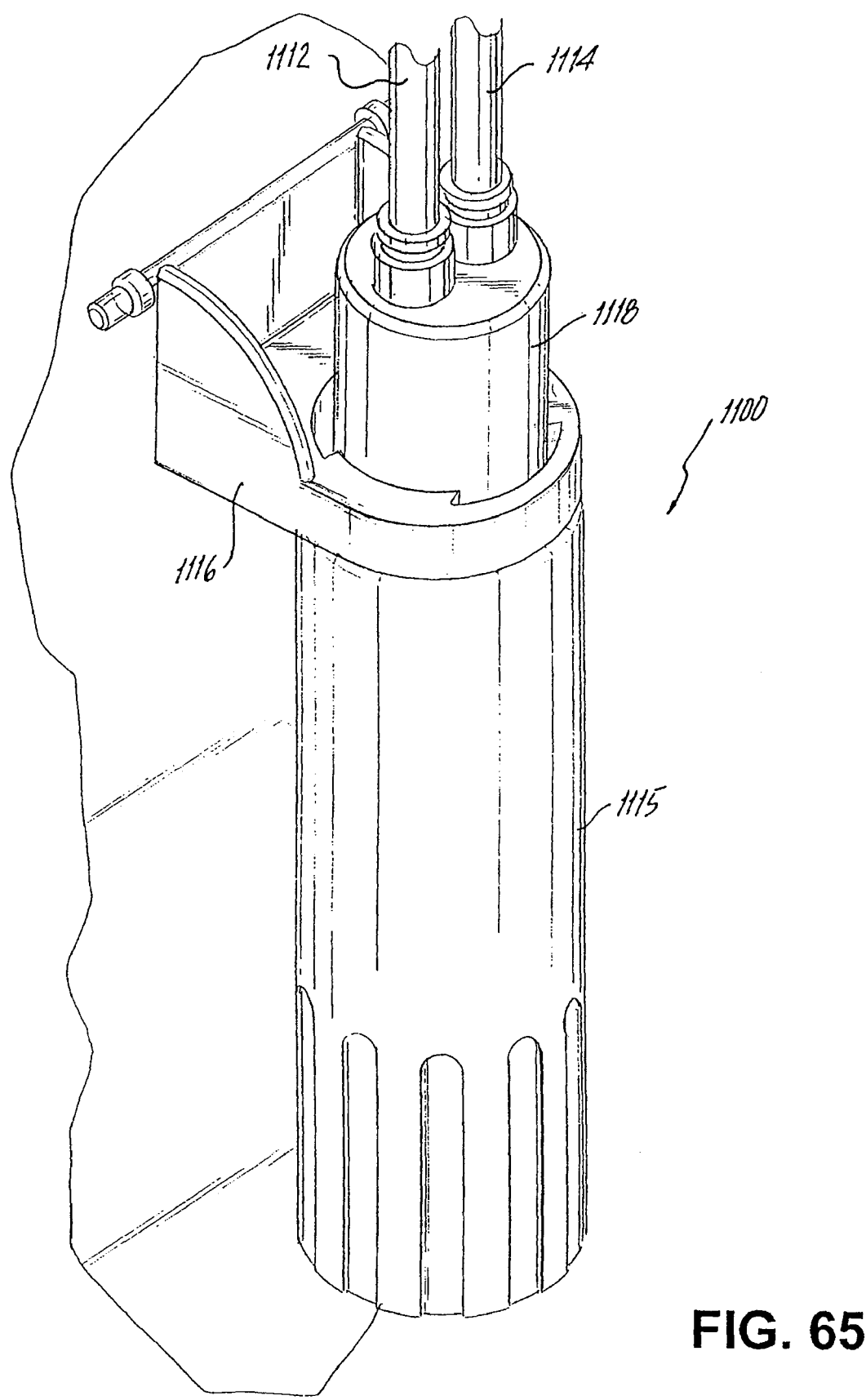
FIG. 65 is a perspective view of another filter assembly constructed in accordance with a representative preferred embodiment of the present disclosure, which includes a novel rotary valve assembly.

Referring now to FIG. 65, there is illustrated another filter assembly constructed in accordance with a representative preferred embodiment of the present disclosure, which is designated generally by reference numeral 1100. Filter assembly 1100 is used in conjunction with a fluid processing system that includes an inlet conduit 1112 for delivering untreated or unprocessed fluid to a replaceable filter/treatment cartridge 1115, and an outlet conduit 1114 for carrying treated or processed fluid from the replaceable cartridge 1115. Filter assembly 1100 is supported relative to the fluid processing system with which it is associated by a mounting bracket 1116, which may be hinged for ease of utilization. Inlet conduit 1112 and outlet conduit 1114 are oriented parallel to one another, and therefore, the filter assembly 1100 is particularly adapted and configured to accommodate this configuration, as discussed in more detail below.

Figure 66:
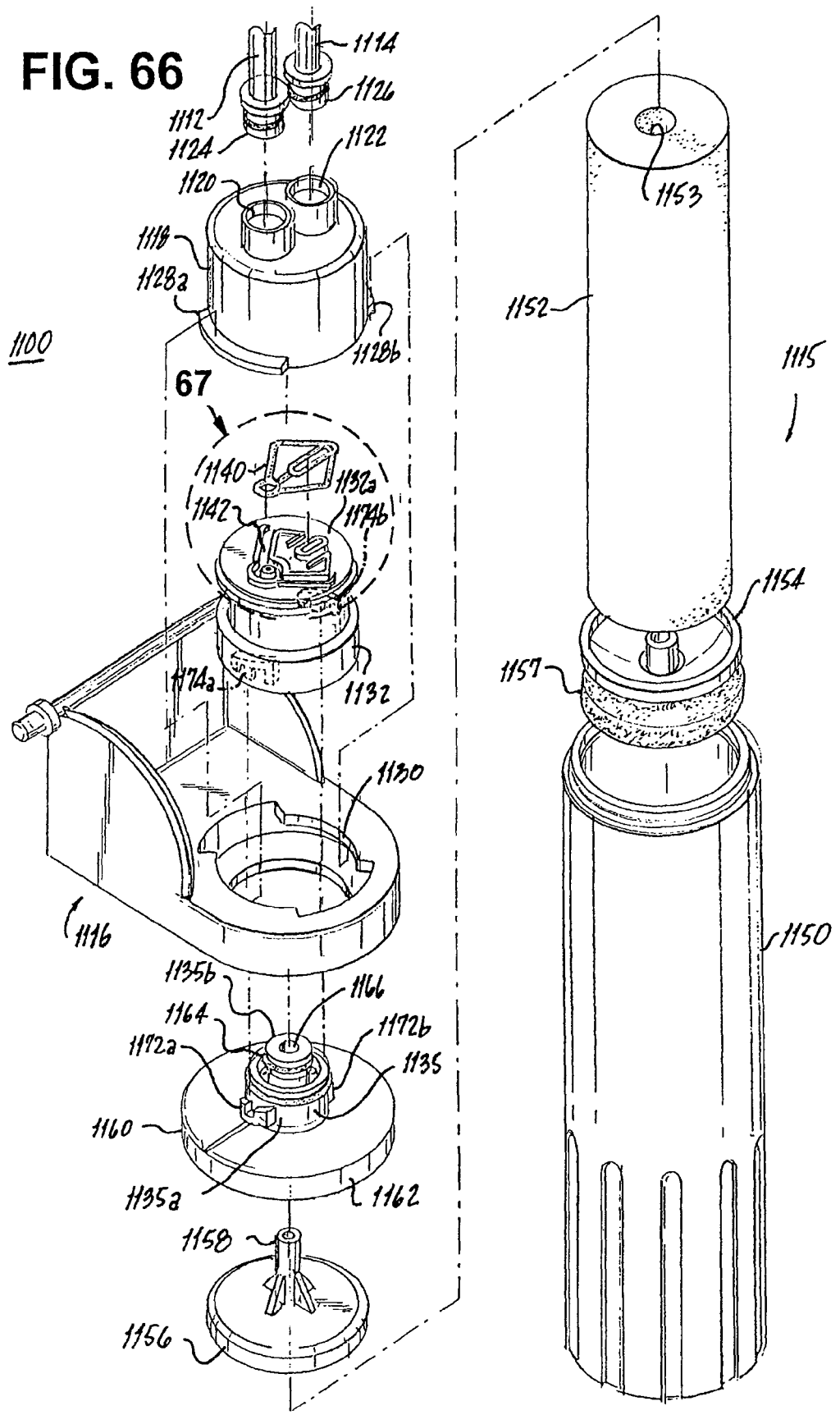
FIG. 66 is an exploded perspective view of the filter assembly of FIG. 65 with parts separated for ease of illustration.

Referring to FIG. 66, filter assembly 1100 includes a head member 1118 having an inlet passage 1120 and an outlet passage 1122. A connector 1124 is provided at the terminal end of inlet conduit 1112 for operative engagement with the inlet passage 1120 of head member 1118, and a connector 1126 is provided at the terminal end of outlet conduit 1114 for operative engagement with the outlet passage 1122 of head member 1118. Head member 1118 includes opposed arcuate camming ramps 1128a, 1128b, which cooperate with corresponding ramped camming surfaces defined within an engagement aperture 1130 formed in the mounting bracket 1116 supporting filter assembly 1110. In use, rotation of head member 1118 relative to aperture 1130 facilitates cooperative interaction between the camming ramps and camming surfaces to releasably engage or otherwise mount the head member 1118 to bracket 1116.

Figure 68:
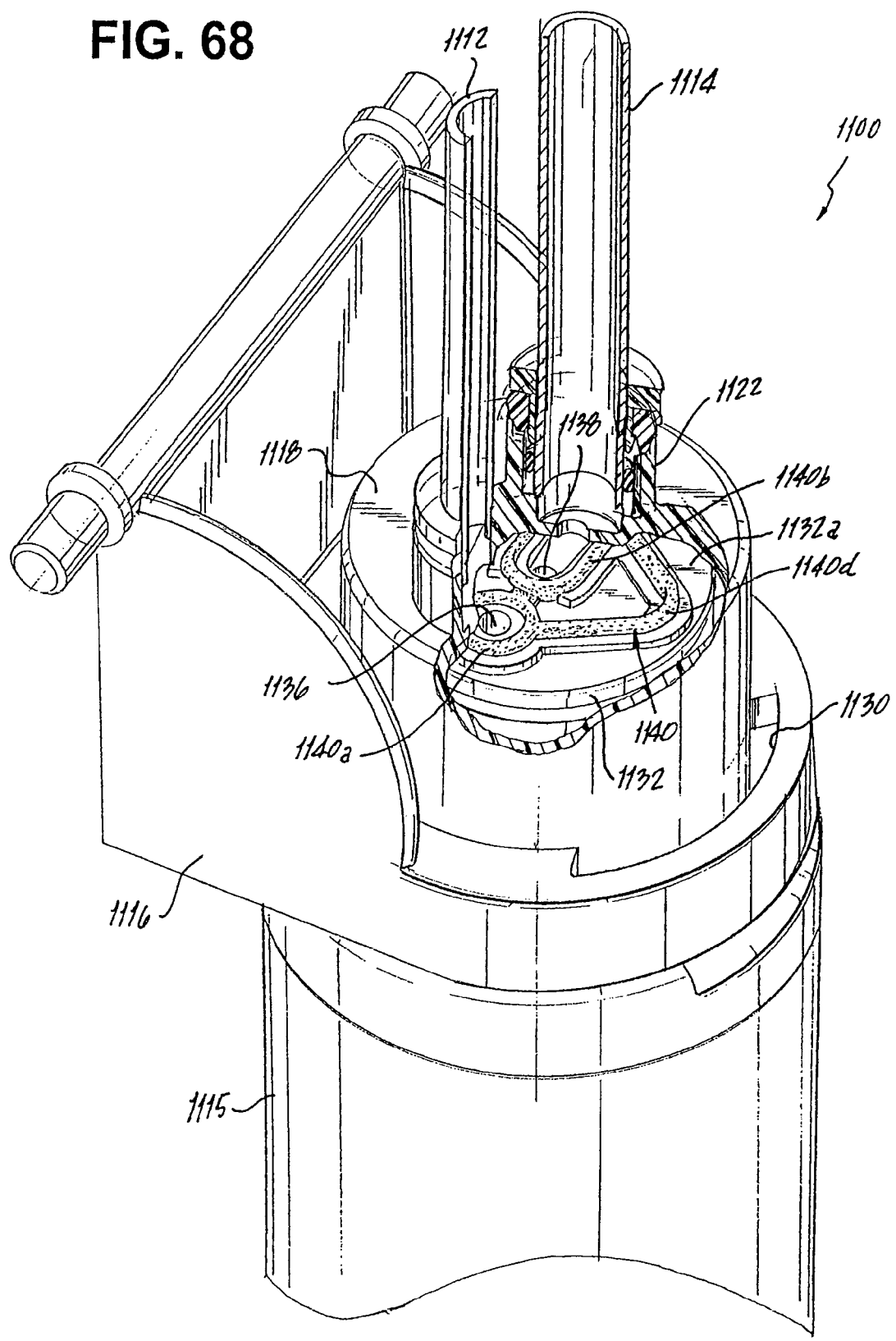
FIG. 68 is a perspective view, in partial cross-section, of the filter assembly of FIG. 65, illustrating the position of the valve member and associated seal when the valve member is in a filter mode, wherein the untreated and treated fluid steams flowing through the inlet and outlet paths of the valve member are sealing isolated from one another.
Figure 69:
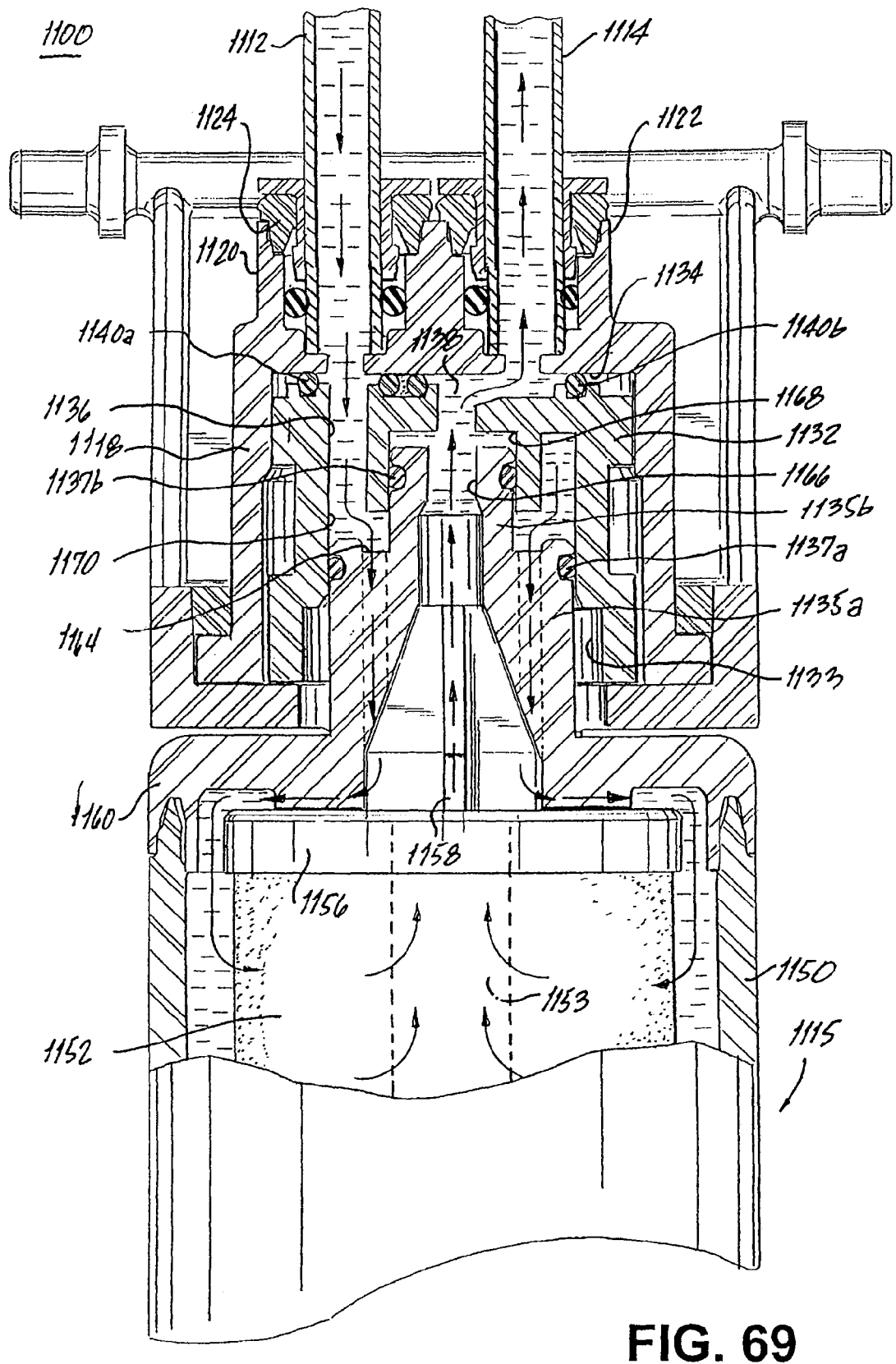
FIG. 69 is a side elevational view taken along line 69-69, illustrating the flow path of untreated and treated fluid through the valve assembly and filter cartridge when the valve member is the filter mode.
Figure 70:
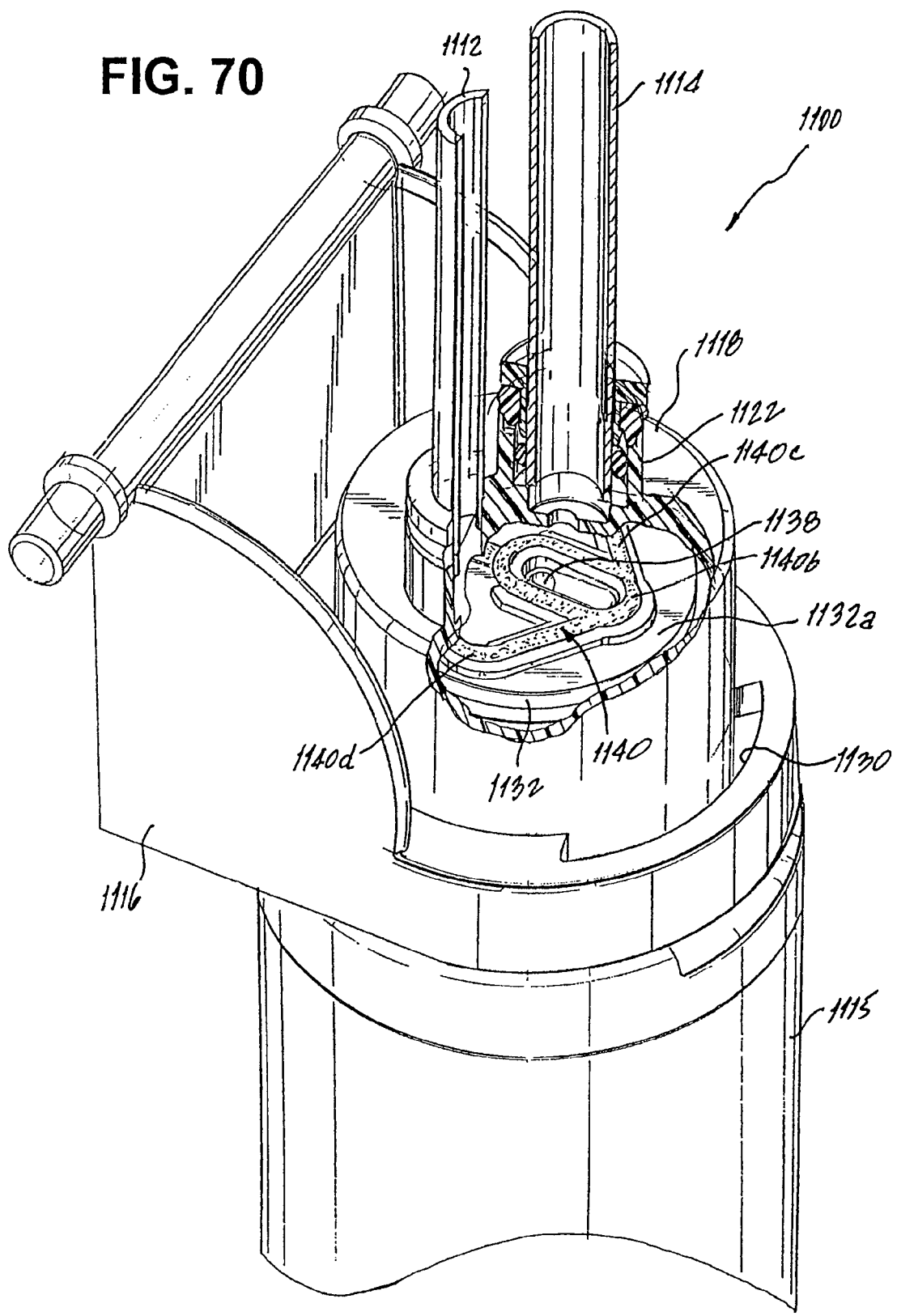
FIG. 70 is a perspective view, in partial cross-section, of the filter assembly of FIG. 65, illustrating the position of the valve member and associated seal when the filter cartridge is in a bypass mode, wherein the inlet and outlet passages of the head member are sealingly isolated from the atmosphere.
Figure 71:
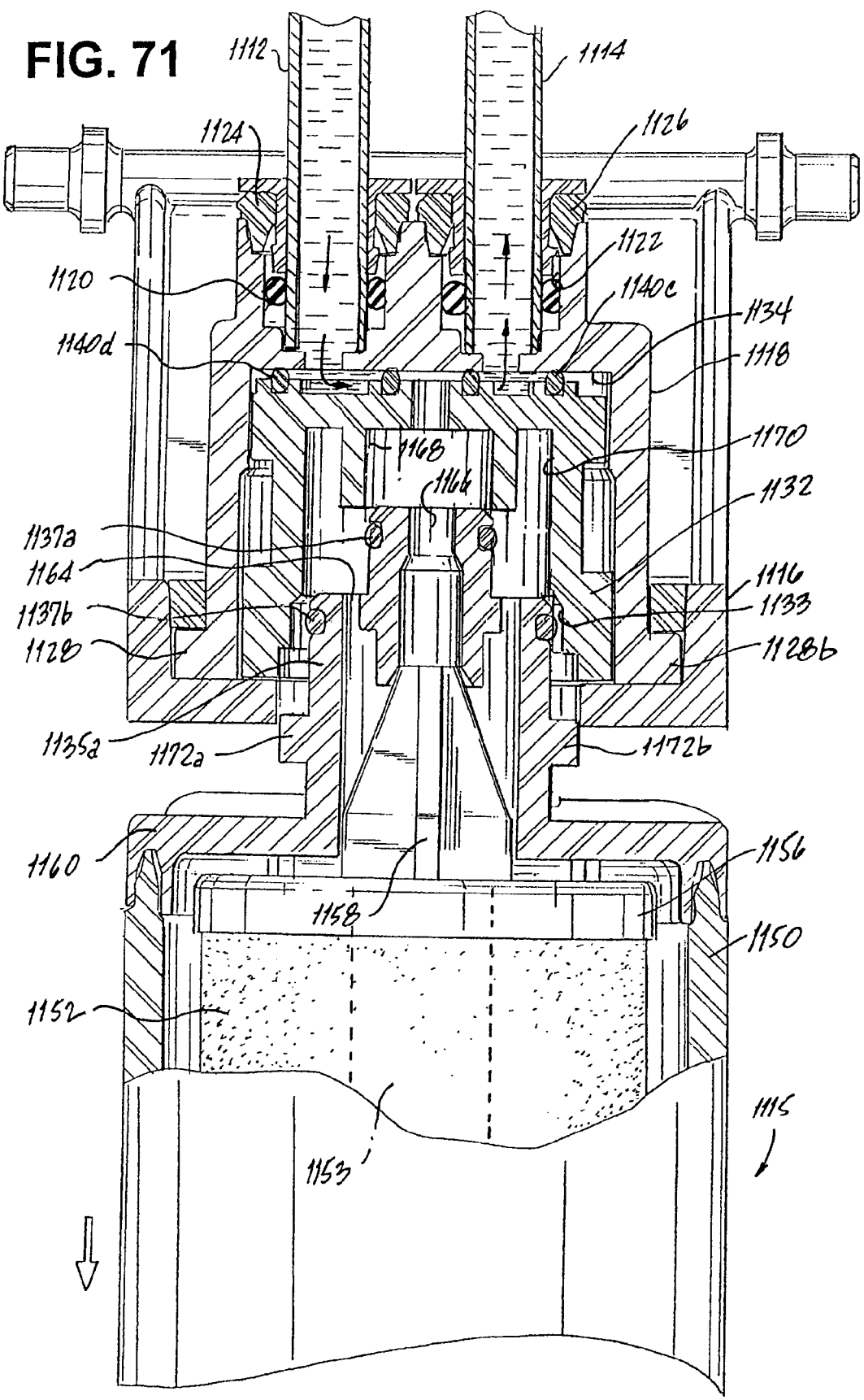
FIG. 71 is a side elevational view taken along line 70-70 when the valve member is in the bypass mode wherein the inlet and outlet passages of the head member remain in fluid communication so that untreated fluid may continue to flow therebetween.

Filter assembly 1100 further includes a valve member 1132, which is accommodated within a valve chamber 1134 formed within head member 1118 (see FIGS. 69 and 71). Similarly, valve member 1132 includes a central reception bore 1133 for accommodating the neck portion 1135 of the replaceable filter cartridge 1115 (see FIGS. 69 and 71). Valve member 1132 is adapted and configured for rotation within valve chamber 1134 between a filter mode/position (FIGS. 68 and 69) wherein untreated fluid is directed into the filter cartridge 1115 and a bypass mode/position (FIGS. 70 and 71) wherein fluid flow to the filter cartridge 1115 is prevented or otherwise blocked. In the bypass mode, the filter cartridge 1115 can be conveniently removed from the filter assembly, discarded and replaced. At such a time, because the inlet and outlet passage 1120, 1122 of head member 1118 remain in fluid communication, untreated processes fluid will continue to flow therebetween.

Valve member 1132 includes an inlet path 1136 and an outlet path 1138. In the filter mode, the inlet path 1136 of valve member 1132 communicates with the inlet passage 1120 of head member 1118, and the outlet path 1138 of valve member 1132 communicates with the outlet passage 1122 of head member 1118. At such a time, fluid may flow to and from the filter cartridge 1115, as discussed in more detail below. In contrast, in the bypass mode, which is attained when the valve member 1132 is manually rotated a quarter turn or 90° from the position shown in FIGS. 68 and 69 to the position shown in FIGS. 70 and 71, the inlet path 1136 of valve member 1132 is moved out of communication with the inlet passage 1120 of head member 1118 and the outlet path 1138 of valve member 1132 is moved out of communication with the outlet passage 1122 of head member 1118. At such a time, fluid flow to and from the filter cartridge 1115 is prevented.

A seal member 1140 is operatively associated with valve member 1132, and more particularly, the seal member 1140 is seated in a conforming or otherwise dimensionally corresponding seating area 1142 formed on or otherwise formed in the upper surface 1132a of valve member 1132. Seal member 1140 is positioned to provide a water-tight/air-tight seal against an opposing surface of valve chamber 1134, and is monolithically formed from an elastomeric material, such as for example, Neoprene or a like material.

Figure 67:
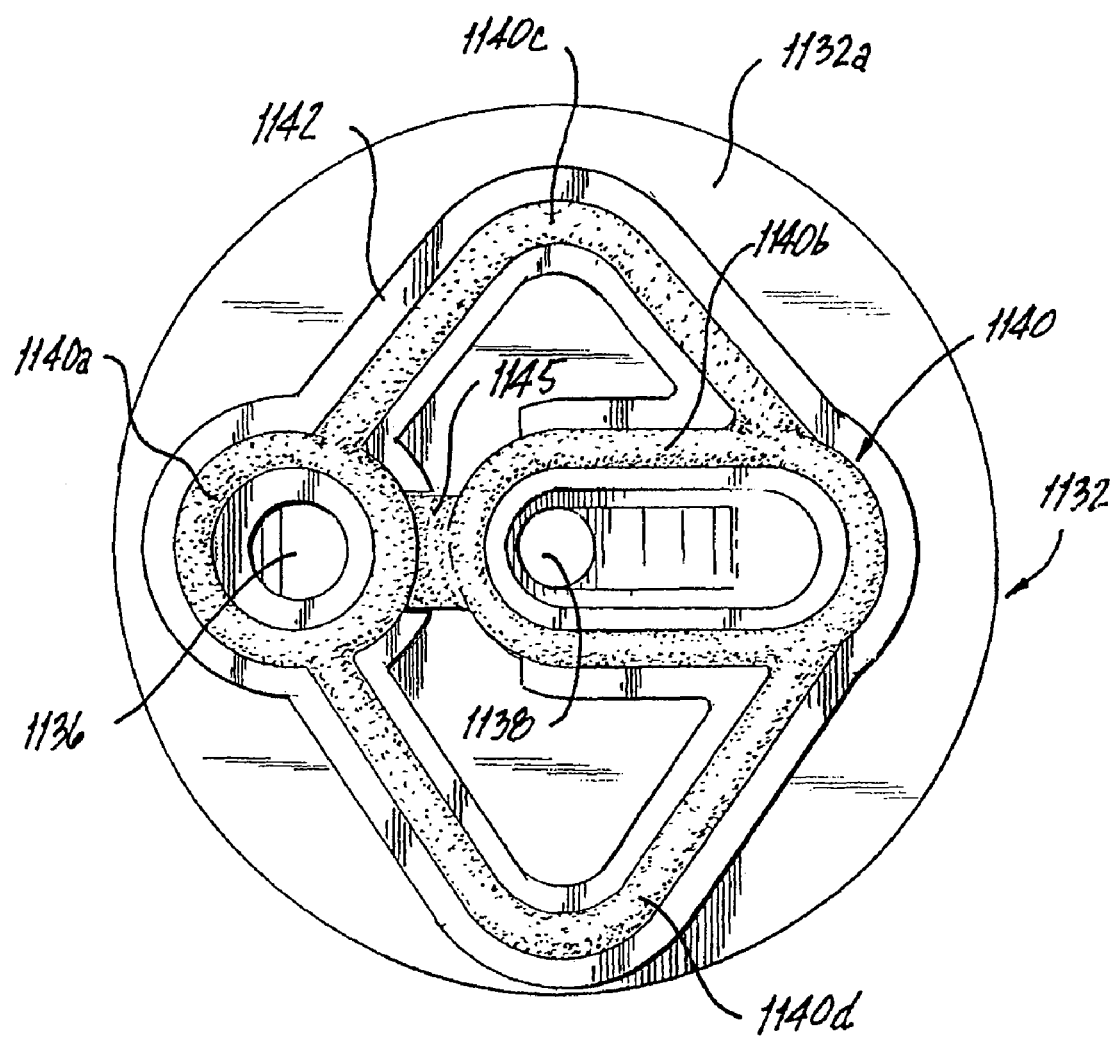
FIG. 67 is a top plan view of the valve member shown in FIG. 66, illustrating the novel seal member of the present disclosure accommodated within a recessed seat defined on the upper surface of the valve member.

As best seen in FIG. 67, seal member 1140 includes a plurality of separate sealing areas 1140a-1140d. Specifically, seal member 1140 includes a first seal portion 1140a of generally circular configuration, which is dimensioned to sealingly isolate the inlet path 1136 of the valve member 1132, when the filter member is in the filter mode/position shown in FIGS. 68 and 69. Seal member 1140 includes a second seal portion 1140b of generally oval configuration, which is dimensioned to sealingly isolate the outlet path 1138 of the valve member 1132, when the valve member is in the filter position. A stabilizing strut 1145 connects the generally circular seal portion 1140a to the generally oval seal portion 1140b to add rigidity to the seal member. The thickness of strut 1145 is less than the diameter of the seal portions connected thereby. Seal member 1140 includes a third seal portion 1140c of generally triangular configuration, and a fourth seal portion 1140d of generally triangular configuration. When the valve member 1132 is in the bypass position shown in FIGS. 70 and 71, seal portions 1140c, 1140d sealingly isolate the inlet and outlet passage 1120, 1122 of the head member 1118 from the atmosphere. In addition, seal portions 1140c, 1140d form a bypass flow path or trough which allows the inlet and outlet passages 1120, 1122 to remain in fluid communication with one another. Consequently, untreated process fluid will continue to flow between the inlet and outlet passages 1120, 1122 of head member 1118.

Referring back to FIG. 66, the replaceable filter cartridge 1115 includes a generally cylindrical sump 1150, which is dimensioned and configured to support a filter element 1152. In this instance, filter element 1152 is an extruded carbon block element. However, other types of filter elements can be employed without departing from the spirit or scope of the subject disclosure. For example, a pleated filter element or a spiral wound filter element can be employed. It is further envisioned that the cartridge 1115 need not take the form of a filter, but in the alternative it can take the form of a cartridge for providing an additive to a fluid stream or for otherwise conditioning a fluid steam. Filter element 1152 has a central bore 1153, into which processed fluid flows. A closed or blind end cap 1154 is positioned at the bottom end of filter element 1152 and an open end cap 1156 is positioned at the top end of filter element 1152. A freeze protection pad 1157 formed from a closed sell foam material is associated with end cap 1154.

End cap 1156 includes an outlet tube 1158, which communicates with the central bore 1153. A sump cover 1160 encloses the interior of sump 1150, and is spin welded or otherwise fastened or affixed to the upper end of sump 1150. Sump cover 1160 includes a base portion 1162 from which extends the neck portion 1135 of filter cartridge 1115. Neck portion 1135 has a stepped construction defined by a lower, radially outer neck portion 1135*a* and an upper, radially inner neck portion 1135*b*. An outer O-ring seal 1137*a* surrounds the outer neck portion 1135*a* and an inner O-ring seal 1137*b* surrounds the inner neck portion 1135*b*. A fluid inlet 1164 is formed between the outer neck portion 1135*a* and the inner neck portion 1135*b*. Fluid inlet 1164 delivers untreated fluid into the interior of sump 1150. A fluid outlet 1166 is defined by the inner neck portion 1135*b*. Fluid outlet 1166 delivers treated fluid from the central bore 1153 of filter element 1152 by way of the outlet tube 1158 of end cap 1156.

As noted above, the neck portion 1135 of cartridge 1115 is accommodated with the interior bore 1133 of valve member 1132, as best seen in FIG. 69. In particular, the central reception bore 1133 of valve member 1132 includes a radially inner bore portion 1168 for sealingly isolating the outlet port 1166 of filter cartridge 1115 and a radially outer bore portion 1170 for sealing isolating the inlet port 1164 of filter cartridge 1115.

As best seen in FIG. 66, a pair of diametrically opposed keyed camming lugs 1172*a*, 1172*b* depend radially outwardly from the outer neck portion 1135*a* for cooperating with corresponding keyed engagement recesses 1174*a*, 1174*b* in the same manner as described previously herein with other representative embodiments of the subject disclosure, wherein the lugs and the recesses have mating surfaces to prevent the use of non-compatible filter cartridges within filtration assembly 1100.

Referring now to FIG. 69, when the valve member 1132 is disposed in the filter position within the valve chamber 1134 of head member 1118, untreated fluid flows from the inlet conduit 1112 into the inlet passage 1120 of head member 1118. The untreated fluid then flows through the communicating inlet path 1136 of valve member 1132 and into the inlet 1164 in the neck portion 1135*a* of filter cartridge 1115. Thereupon, untreated fluid fills the sump 1150 of filter cartridge 1115 and flows radially inwardly through the carbon block filter element 1152 to the central bore 1154. Filtered fluid then flows from central bore 1154 of the filter element 1152, through the outlet tube 1158, to the outlet 1166 in the neck portion 1135*b* of filter cartridge 1115. The filtered fluid then flows through the outlet path 1138 of valve member 1132, into the communicating outlet passage 1122 of head member 1118, and exits the filter assembly 1100 by way of outlet conduit 1114. At this time, the first seal portion 1140*a* of seal member 1140 sealingly isolates the inlet path 1136 of the valve member 1132, and the second seal portion 1140*b* of seal member 1140 sealingly isolate the outlet path 1138 of the valve member 1132.

Referring now to FIG. 71, when the valve member 1132 (accompanied by filter cartridge 1115) is rotated into or otherwise disposed in the bypass position within the valve chamber 1134 of head member 1118, untreated fluid is prevented or otherwise blocked from flowing from the inlet passage 1120 of head member 1118 to the inlet path 1136 of valve member 1132. Similarly, the outlet path 1138 of valve member 1132 is moved out of communication with the outlet passage 1122 of head member 1118. At this time, the third and fourth seal portions 1140*c*, 1140*d* of seal member 1140 sealingly isolate the inlet and outlet passages 1120, 1122 of head member 1118 from the atmosphere. In addition, a flow path is provided between the inlet and outlet passage 1120, 1122 of head member 1118, which permits untreated process fluid to flow therebetween. At such as time, the replaceable filter cartridge 1115 can be removed from the valve member 1132 without loss of process fluid.

Although the disclosed fluid filtration apparatus has been described with respect to exemplary, representative, presently preferred embodiments, it is apparent that modifications and changes can be made thereto without departing from the spirit and scope of the invention as defined by the appended claims

What is claimed is:

1. A filter cartridge comprising:
   a body portion configured to contain at least one filter media, said body portion coaxially surrounding a central axis; and
   a neck portion depending from the body portion, said neck portion coaxially surrounding a central axis;
   wherein the neck portion comprises an inlet port for directing a fluid into the body portion, an outlet port for directing the fluid out of the body portion, and at least two lugs depending radially therefrom relative to said central axis, each of the at least two lugs comprising:
   an upper surface facing substantially axially away from the body portion relative to said central axis;
   a radially outer surface facing substantially radially away from the neck portion relative to said central axis;
   an inclined cam surface facing substantially axially toward the body portion relative to said central axis; and
   a keyed surface formation comprising at least one tooth projecting axially from the upper surface of the lug and facing substantially away from the body portion and at least one tooth projecting radially from the outer surface of the lug and facing substantially away from the neck portion.

2. The filter cartridge claim 1 wherein the keyed surface formation of one lug is different from the keyed surface formation of at least one other lug.

3. The filter cartridge claim 2 wherein the keyed surface formation of each lug is different.

4. The filter cartridge of claim 1 wherein each at least one tooth projecting axially from the upper surface of the lug is disposed in a tooth position of a defined tooth configuration.

5. The filter cartridge of claim 4 wherein the defined tooth configuration comprises one of 4 tooth positions, 5 tooth positions, or 6 tooth positions.

6. The filter cartridge of claim 4 wherein the tooth configuration comprises a number of available tooth combinations:

$N=2^{n-2}-1$, wherein "n" is the number of tooth positions.

7. The filter cartridge of claim 1 wherein each at least one tooth projecting radially from the radially outer surface of the lug is disposed in a tooth position of a defined tooth configuration.

8. The filter cartridge of claim 7 wherein defined tooth configuration comprises one of 4 tooth positions, 5 tooth positions, or 6 tooth positions.

9. The filter cartridge of claim 7 wherein the tooth configuration comprises a number of available tooth combinations:

$N=2^{n-2}-1$, wherein "n" is the number of tooth positions.

10. The filter cartridge of claim 1 wherein the inclined cam surface comprises a rounded surface.

11. The filter cartridge of claim 1 wherein the keyed surface formation comprises at least one tooth that projects from the lug both radially and axially.

12. A filter cartridge comprising:
a body portion configured to contain at least one filter media, said body portion coaxially surrounding a central axis; and
a neck portion depending from the body portion, said neck portion coaxially surrounding said central axis;
wherein the neck portion comprises an inlet port for directing a fluid into the body portion, an outlet port for directing the fluid out of the body portion, and at least two lugs depending radially therefrom relative to said central axis, each of the at least two lugs comprising:
an upper surface facing substantially axially away from the body portion relative to said central axis;
an inclined cam surface facing substantially axially toward the body portion relative to said central axis; and
a keyed surface formation comprising at least one tooth projecting axially from the upper surface of the lug and facing substantially away from the body portion, wherein the keyed surface formation of one lug is different from the keyed surface formation of at least one other lug.

13. The filter cartridge of claim 12 wherein the keyed surface formation comprises at least one tooth that projects from the lug both radially and axially.

14. The filter cartridge of claim 12 wherein the keyed surface formation of each lug is different.

15. A filter cartridge comprising:
a body portion configured to contain at least one filter media, said body coaxially surrounding a central axis; and
a neck portion depending from the body portion, said neck portion coaxially surrounding a central axis;
wherein the neck portion comprises an inlet port for directing a fluid into the body portion, an outlet port for directing the fluid out of the body portion, and at least two lugs depending radially therefrom relative to said central axis, each of the at least two lugs comprising:
an upper surface facing substantially axially away from the body portion relative to said central axis;
a free end surface facing substantially radially away from the neck portion relative to said central axis;
an inclined cam surface facing substantially axially toward the body portion relative to said central axis; and
a keyed surface formation comprising at least one tooth projecting axially from the upper surface of the lug and facing substantially away from the body portion and at least one tooth projecting radially from the free end surface of the lug and facing substantially away from the neck portion, wherein the keyed surface formation is configured to engage a complimentary keyed surface formation on a corresponding reception assembly.

16. The filter cartridge of claim 15 wherein each lug further comprises a horizontal surface facing toward the body portion and adjoining the inclined cam surface.

17. The filter cartridge claim 16 wherein the keyed surface formation of one lug is different from the keyed surface formation of at least one other lug.

18. The filter cartridge claim 17 wherein the keyed surface formation of each lug is different.

19. The filter cartridge of claim 15 wherein the keyed surface formation comprises at least one tooth that projects from the lug both radially and axially.

20. A filter cartridge comprising:
a body portion configured to contain at least one filter media, said body portion coaxially surrounding a central axis; and
a neck portion depending from the body portion, said neck portion coaxially surrounding said central axis;
wherein the neck portion comprises an inlet port for directing a fluid into the body portion, an outlet port for directing the fluid out of the body portion, and at least two lugs depending radially therefrom relative to said central axis, each of the at least two lugs comprising:
an upper surface facing substantially axially away from the body portion relative to said central axis;
an inclined cam surface facing substantially axially toward the body portion relative to said central axis and a horizontal surface facing toward the body portion and adjoining the inclined cam surface; and
a keyed surface formation comprising at least one tooth projecting axially from the upper surface of the lug and facing substantially away from the body portion,
wherein the keyed surface formation of one lug is different from the keyed surface formation of at least one other lug.

21. The filter cartridge claim 20 wherein the keyed surface formation of each lug is different.

22. The filter cartridge of claim 20 wherein the keyed surface formation comprises at least one tooth that projects from the lug both radially and axially.

* * * * *

UNITED STATES PATENT AND TRADEMARK OFFICE
CERTIFICATE OF CORRECTION

Page 1 of 1

PATENT NO. : 7,763,170 B2
APPLICATION NO. : 12/173692
DATED : July 27, 2010
INVENTOR(S) : Laurence W Bassett It is certified that error appears in the above-identified patent and that said Letters Patent is hereby corrected as shown below:

Column 22, Line 32, delete "claims" and insert --claims.--.

Column 22, Line 39, In Claim 1, delete "a central" and insert --said central--.

Column 22, Line 54, In Claim 1, delete "the outer" and insert --the radially outer--.

Column 22, Line 57, In Claim 2, delete "cartridge claim" and insert --cartridge of claim--.

Column 22, Line 60, In Claim 3, delete "cartridge claim" and insert --cartridge of claim--.

Column 23, Line 51 (approx.), In Claim 15, delete "body coaxially" and insert --body portion coaxially--.

Column 23, Line 54 (approx.), In Claim 15, delete "a central" and insert --said central--.

Column 24, Line 5, In Claim 15, delete "a free end" and insert --a radially outer--.

Column 24, Line 12, In Claim 15, delete "free end" and insert --radially outer--.

Column 24, Line 20, In Claim 17, delete "cartridge claim" and insert --cartridge of claim--.

Column 24, Line 23, In Claim 18, delete "cartridge claim" and insert --cartridge of claim--.

Column 24, Line 51, In Claim 21, delete "cartridge claim" and insert --cartridge of claim--.

Signed and Sealed this
Twenty-eighth Day of June, 2011

David J. Kappos
*Director of the United States Patent and Trademark Office*